(12) United States Patent
Smith et al.

(10) Patent No.: US 6,241,266 B1
(45) Date of Patent: Jun. 5, 2001

(54) TRAILING ARM SUSPENSION WITH WRAPPER COMPRESSION AXLE MOUNTING AND ARTICULATED AXLE MOUNTING

(75) Inventors: John P. Smith, Grand Rapids; William C. Pierce, Muskegon, both of MI (US)

(73) Assignee: Holland Neway International, Inc., Muskegon, MI (US)

( * ) Notice: Subject to any disclaimer, the term of this patent is extended or adjusted under 35 U.S.C. 154(b) by 0 days.

(21) Appl. No.: 09/134,856

(22) Filed: Aug. 14, 1998

Related U.S. Application Data

(63) Continuation-in-part of application No. PCT/US97/18733, filed on Oct. 21, 1997, which is a continuation-in-part of application No. PCT/US96/12616, filed on Aug. 2, 1996.
(60) Provisional application No. 60/029,599, filed on Oct. 23, 1996, provisional application No. 60/001,880, filed on Aug. 3, 1995, and provisional application No. 60/010,350, filed on Jan. 16, 1996.

(51) Int. Cl.[7] .................................................. B60G 11/26
(52) U.S. Cl. ............................ 280/124.116; 280/124.157
(58) Field of Search ....................... 280/124.116, 124.11, 280/124.157, 124.164

(56) References Cited

U.S. PATENT DOCUMENTS

| | | |
|---|---|---|
| 1,643,970 | 10/1927 | Wilkins . |
| 2,367,817 | 1/1945 | Brown . |

(List continued on next page.)

FOREIGN PATENT DOCUMENTS

| | | |
|---|---|---|
| 1 265 596 | 4/1968 | (DE) . |
| 1 455 649 | 12/1968 | (DE) . |

(List continued on next page.)

*Primary Examiner*—J. J. Swann
*Assistant Examiner*—F. Zeender
(74) *Attorney, Agent, or Firm*—Rader, Fishman, Grauer & Mc Garry

(57) ABSTRACT

A vehicle axle has mounted thereto a vehicle component, such as a brake actuator, a radius rod or track bar tower or a suspension for mounting the axle to the vehicle frame through an axle wrapper band which uniformly compresses the axle to provide a substantial frictional force between the axle and the wrapper band of a magnitude to prevent any appreciable translation or rotational movement of the axle with respect to the wrapper band in normal service on a vehicle. The axle can be round or multi-sided and the wrapper band has a corresponding shape. The wrapper band can be formed in parts, for example, U-shaped or L-shaped halves, and compressed towards each other before joining the halves either by welding or by a mechanical attachment. Alternatively, the wrapper band can be unitary in nature, heated and press-fit onto the axle. The wrapper band applies compressive pressure uniformly to the axle along multiple angularly spaced axes and minimizes or eliminates the need for welding the components to the axle.

In one embodiment, a trailing arm suspension mounts an axle to a trailing arm through an axle-beam connector which includes a wrapper band which retains the axle on the axle-beam connector to prevent movement of the axle with respect to the wrapper band under ordinary service conditions. Two axle-beam connectors are mounted to one of the arms at one end thereof through a bushed connection and are rigidly connected to the axle at another end thereof through compression mounting by the wrapper bands. Each of the arms forms a collar which receives the axle. An elastomeric layer is positioned between the axle and the collar for articulation between the axle and the collar. Each of the beam-axle connectors is identical and is symmetrical about a longitudinal axis. Each beam-axle connector is generally triangular in two dimensional configuration and has a reinforcing gusset at an upper portion thereof and at a lower portion thereof. Each beam-axle connector further includes an arcuate plate at the other end thereof and through which the beam-axle connector is mounted to the axle.

54 Claims, 23 Drawing Sheets

U.S. PATENT DOCUMENTS

| | | |
|---|---|---|
| 2,865,652 | 12/1958 | Easton . |
| 2,929,617 | 3/1960 | Lewis et al. . |
| 3,547,215 * | 12/1970 | Bird ............................ 280/124.116 |
| 3,630,541 | 12/1971 | Carlson et al. . |
| 4,293,145 | 10/1981 | Taylor . |
| 4,310,171 | 1/1982 | Merkle . |
| 4,497,504 | 2/1985 | Duff . |
| 4,615,539 * | 10/1986 | Pierce ........................... 280/124.157 |
| 4,693,486 | 9/1987 | Pierce et al. . |
| 4,858,949 | 8/1989 | Wallace et al. . |
| 5,013,063 | 5/1991 | Mitchell . |
| 5,039,124 | 8/1991 | Widmer . |
| 5,112,078 | 5/1992 | Galazin et al. . |
| 5,116,075 | 5/1992 | Pierce . |
| 5,288,100 | 2/1994 | Cherry et al. . |
| 5,328,159 | 7/1994 | Kaufman et al. . |
| 5,366,237 | 11/1994 | Dilling et al. . |
| 5,639,110 | 6/1997 | Pierce et al. . |
| 5,690,353 | 11/1997 | Vandenberg . |
| 5,746,441 * | 5/1998 | VanDenberg ................. 280/124.116 |
| 5,882,031 * | 3/1999 | VanDenberg ................. 280/124.116 |

FOREIGN PATENT DOCUMENTS

| | | |
|---|---|---|
| 77 28 344 | 5/1978 | (DE) . |
| 42 32 778 | 1/1994 | (DE) . |
| 42 32 779 | 2/1994 | (DE) . |
| 0 600 198 | 6/1994 | (EP) . |
| 0 625 440 | 11/1994 | (EP) . |

* cited by examiner

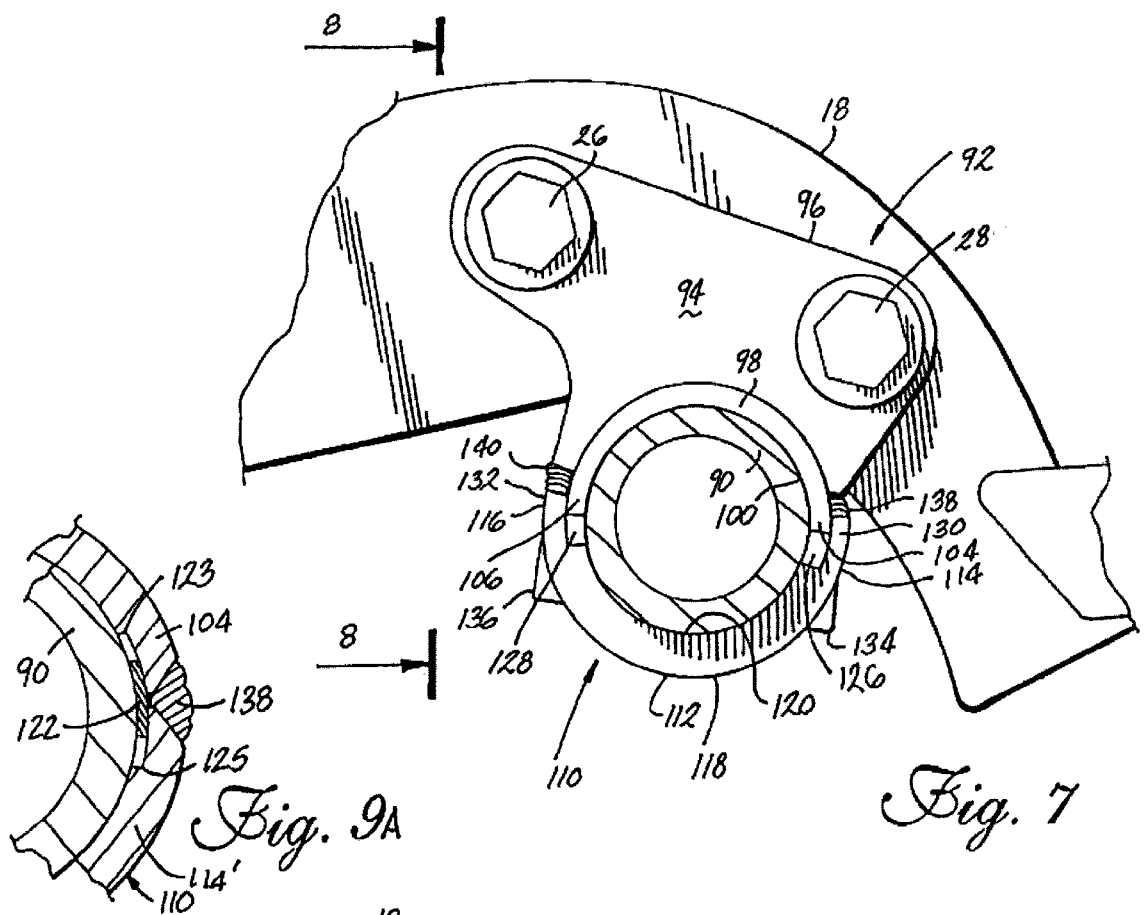
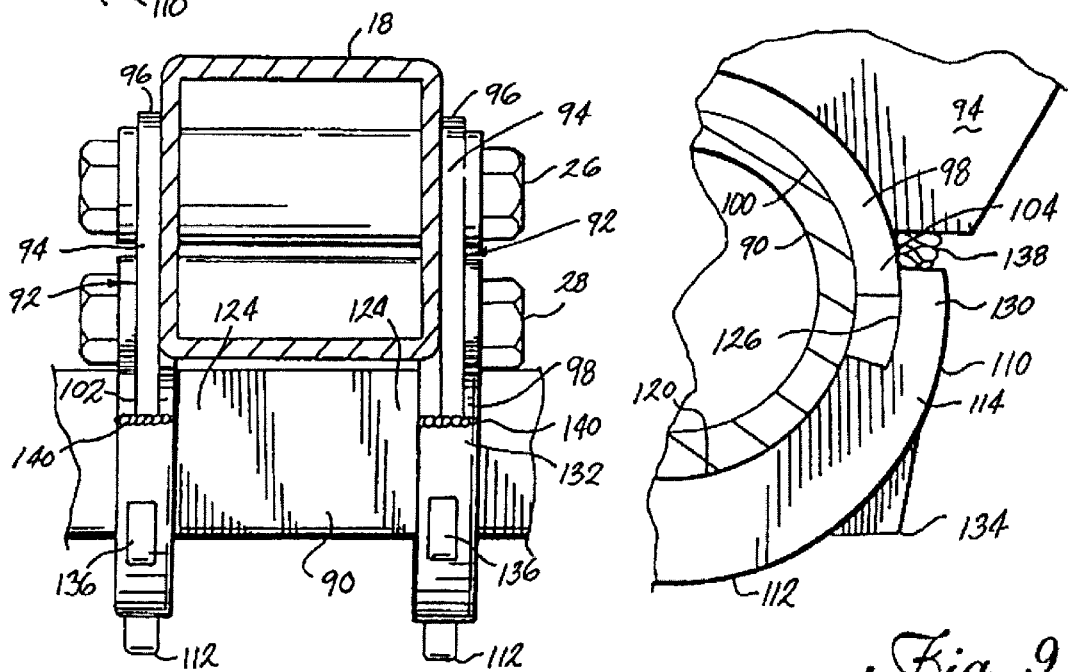

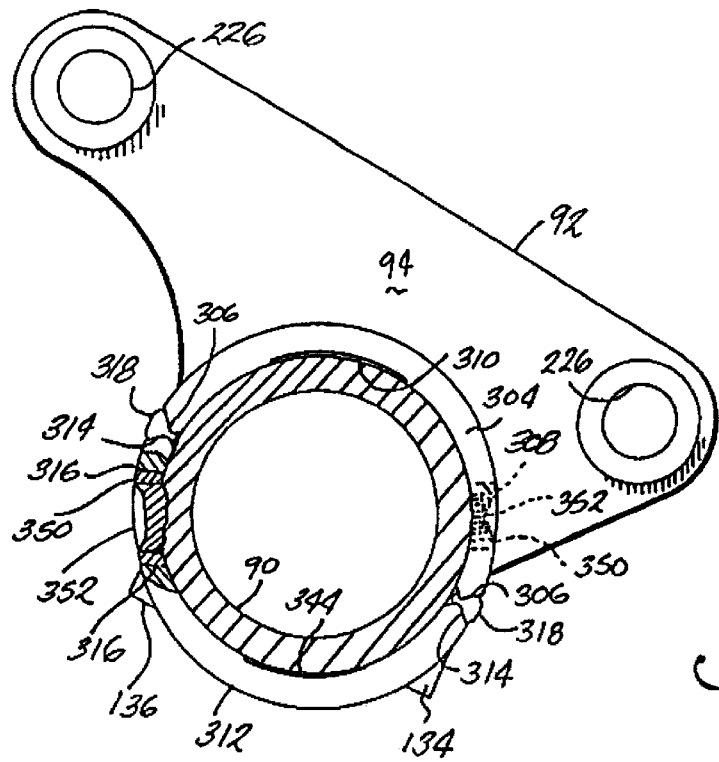
Fig. 26
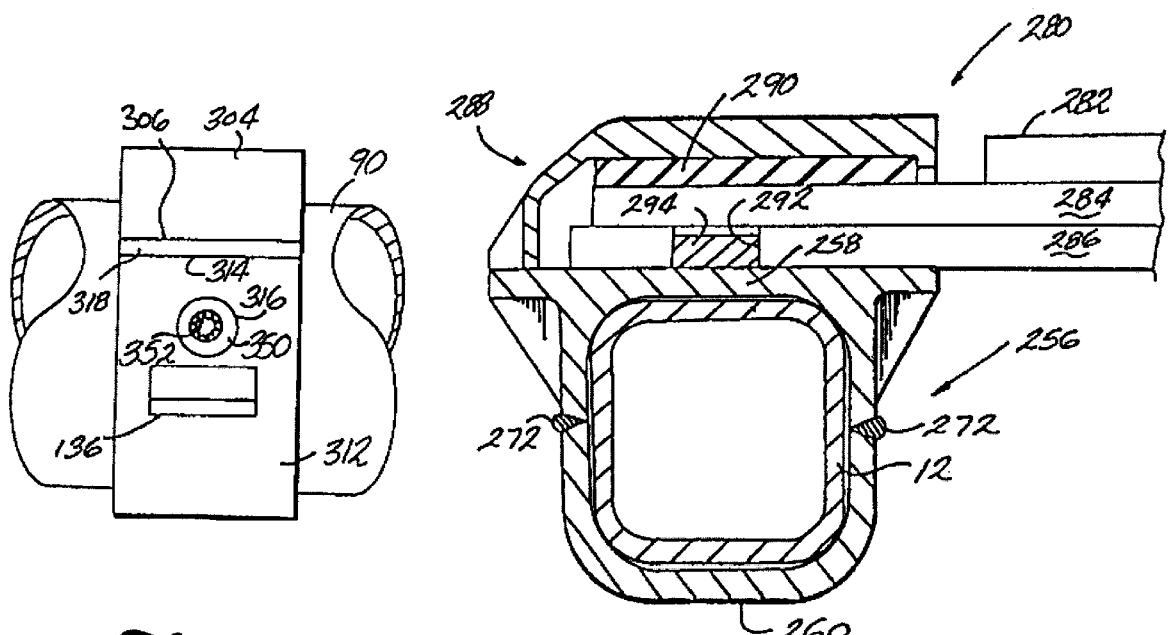
Fig. 27
Fig. 19

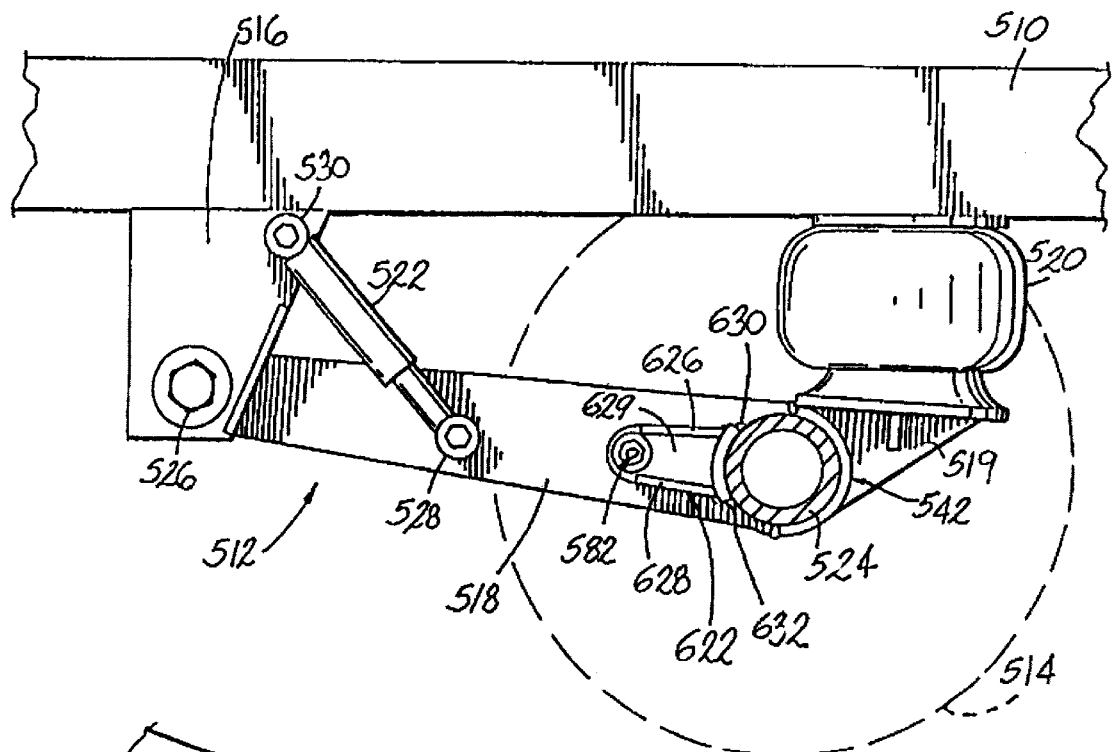
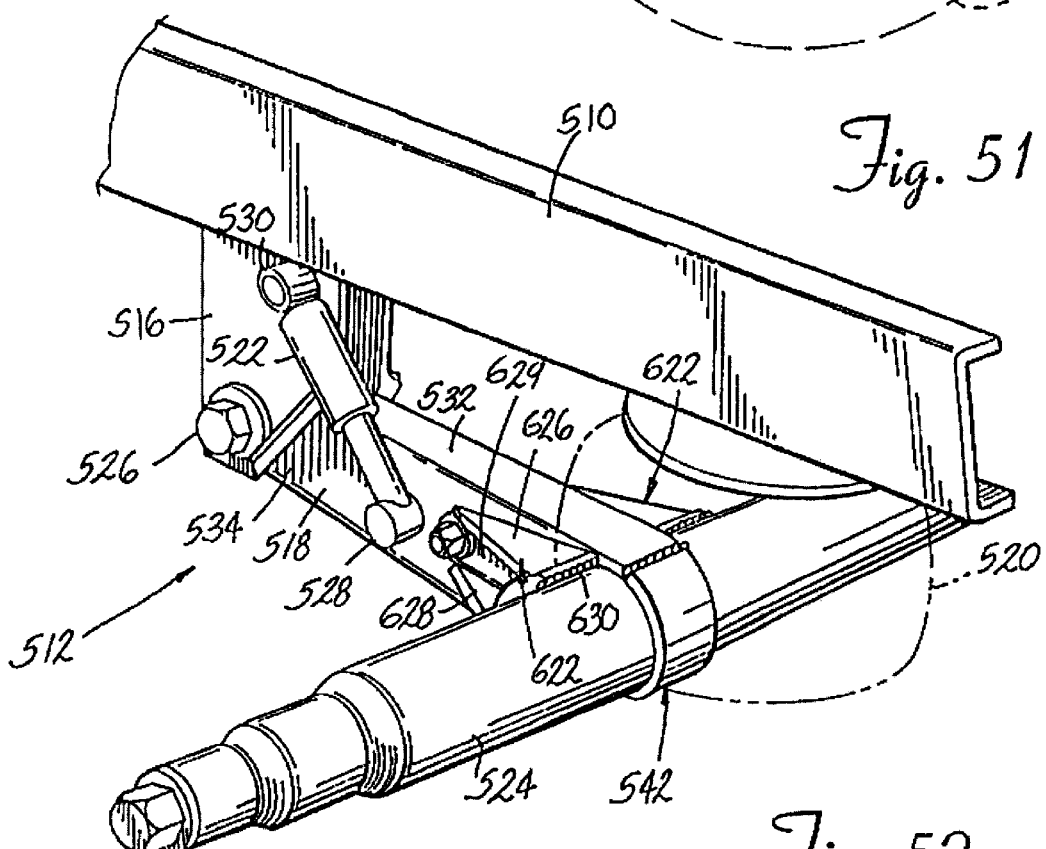
Fig. 51
Fig. 52

TRAILING ARM SUSPENSION WITH WRAPPER COMPRESSION AXLE MOUNTING AND ARTICULATED AXLE MOUNTING

CROSS-REFERENCE TO RELATED APPLICATIONS

This application is a continuation in part of PCT International Application Number PCT/US97/18733 Oct. 21, 1997 which is a continuation in part of PCT International Application Number PCT/US96/12616 filed Aug. 2, 1996. This application claims benefit of provisional application Ser. No. 60/029,599, filed Oct. 23, 1996, 60/001,880, filed Aug. 3, 1995 and Ser. No. 60/010,350, filed Jan. 16, 1996.

BACKGROUND OF THE INVENTION

1. Technical Field

This invention relates to vehicle suspension systems for mounting ground-engaging wheels to a vehicle frame, and, more particularly, to vehicle suspensions having an improved system for mounting a wheel-carrying axle without weakening the axle. In another of its aspects, the invention relates to a trailing arm suspension wherein an axle is mounted to the trailing arm for articulation with respect to the trailing arm.

2. Description of Related Art

The U.S. Pat. No. 3,547,215 to Bird (issued Dec. 15, 1970), discloses a trailing arm suspension wherein a square axle is typically welded to a bracket which is, in turn, secured to the trailing arm of the vehicle suspension structure. The weld securing the axle to the bracket is usually made at the mid-point of the side of the axle where vertical bending moment stresses are neutral. However, these areas are areas of high torsional loading which results from brake torque, vehicle roll and diagonal axle (wheel) walk. The welding at the mid-point of the axle may introduce a point of weakness where cracks can initiate. The weakness in the typical axle welded to a bracket is caused, in part, by the undesirable heat-treating effects and microscopic cracking caused by the welding process upon the axle structure in the localized area adjacent to the weld. In addition, craters or strike marks may form points at which cracks may initiate or at which stresses may become concentrated.

Axles are typically welded to the brackets in order to securely attach the axle to the bracket under this high loading condition. The axle is welded to the axle bracket by a line weld on either side of the bracket. Because it is a line weld, the weld has "ends" at which stresses are concentrated and at which cracks may initiate.

A solution to this weld problem is disclosed in U.S. Pat. No. 4,693,486 to Pierce et al. (issued Sep. 15, 1987), which discloses a trailing arm suspension in which an axle secured to a trailing arm by a wrapper plate partially surrounding the axle, a bolt compresses the wrapper plate about the axle so that the wrapper plate supports and strengthens the axle, and a circular plug weld is positioned on the axle in a circular opening in the wrapper plate to attach the wrapper plate to the axle. Although this system is a significant improvement over the previous welds to the axle, the plug weld still may be a source of stress cracks in the axle.

The U.S. Pat. No. 5,116,075 to Pierce (issued May 26, 1992), discloses a trailing arm suspension wherein a wrapper plate is mounted to an axle through mechanical compression and without welding to the axle. Adapter plates mounted to the ends of the plate apply a compressive force to the corners of a square axle when the wrapper plate is compressed against the axle by a bolt. The wrapper plate is mounted on a pair of side plates which in turn are fixed to the trailing arm. Although the suspension is effective to overcome the potential of crack initiation of the axle between the axle and the axle bracket, the wrapper plate is relatively heavy and a considerable amount of skilled labor is involved in assembling the axle to the trailing arm suspension, frequently at the point of assembly to the axle and suspension to the vehicle. The forces of compression tend to be somewhat uneven. The compressive forces exerted by the adapter plates in particular can be relatively high compared to the compressive forces exerted by the wrapper plate.

The U.S. Pat. No. 5,328,159, Kaufman, discloses a trailing arm suspension in which a pair of U-shaped bracket plates mount U-shaped rubber pads and are clamped onto a square axle with the rubber pads between the bracket plates and the axle. The axle is at a slight angle with respect to the bracket plates so that the bracket plates present a slight diagonal force to the side walls of the axle. The axle is presumably welded to the bracket plates.

The U.S. Pat. No. 5,366,237, to Dilling et al., discloses a trailing arm suspension in which a pair of semi-cylindrical bracket plates are welded to a round axle through an opening between the two plates and along the parting lines between the bracket plates. The axle extends through two openings in the trailing arm and is secured thereto by welding the bracket plates to the beams. The bracket plates are relatively wide and do not deflect when the axle bends. Thus, stress risers can form on the axle at the side edges of the bracket plates. A brake actuator is mounted to the trailing arms for operating brakes on the axle wheels. Welding to the axle can also introduce undesirable microscopic cracks which can initiate fatigue cracks and ultimately lead to failure of the axle due to torsional stress on the axle.

It is also common to mount a track bar between a trailing arm and a central portion of an axle. The track bar is mounted to the axle through a tower bracket which is welded to a central portion of the axle. The welds between the tower bracket and the axle can introduce in the axle weak points and microscopic cracks which can form sources of cracks which may ultimately result in failure of the axle under severe or prolonged loading conditions.

DE 42 32 779 and DE 42 32 778 disclose a vehicle suspension system with an air spring or a leaf spring wherein a relatively square axle is tied in to the suspension through a U-bolt and axle plate which bears against the axle at an upper portion. A filler can be provided in the bottom of the U-bolt. A ring received in an opening in the axle plate is welded to an upper surface of the axle. Frictional force resulting from pressure applied by the axle plate at the upper corners of the axle and by the filler plate at the bottom corners of the axle coupled with the welded ring is said to hold the axle against movement in the mounting. A U-bolt does not give consistent and sufficient compressive forces to adequately prevent slippage of an axle in the mounting and does not work well with round axles.

SUMMARY OF THE INVENTION

According to the invention, a vehicle axle has mounted thereto a vehicle component, such as a brake actuator, a radius rod tower or a suspension for mounting the axle to a vehicle frame, through an axle wrapper band which uniformly compresses the axle to provide a substantial frictional force between the axle and the wrapper band of a magnitude to prevent any appreciable translational or rotational movement of the axle with respect to the wrapper band in service on a vehicle. The wrapper band has a width to thickness ratio substantially in excess of one in that it is considerably wider than thick. The axle mounting assemblies generally take three forms:

(1) A square, rectangular, hexagonal or other polygonal cross-sectional shaped axle is compression loaded with a wrapper band which applies force at an area very near the tangent point between the side of the axle and the corner radius. In this embodiment, the wrapper band has interior corners corresponding to the corners of the axle with radii of curvature smaller than the exterior radius of curvature of the axle corners and the wrapper band is assembled essentially diagonally across the corners of the axle.

(2) A square, rectangular, hex or other polygonal cross-sectional shaped axle is compression loaded with a wrapper band which applies force at the corners of the axle. In this embodiment, the wrapper band has interior corners corresponding to the corners of the axle with radii of curvature larger than the exterior radii of curvature of the axle corners and the wrapper band is assembled essentially 45° to the diagonal of the axle.

(3) A round, elliptical or similar cross-sectional shaped axle is compression loaded from a wrapper band which is relatively evenly distributed around the circumference of the axle.

The invention can be accomplished in a number of ways. Generally, a compressive wrapper band is formed from two plates which are shaped to conform to the shape of the axle. The conforming plates are compressed toward each other around the axle and joined together, preferably by welding, or alternatively by mechanical fasteners, to maintain the plates in tension, thereby uniformly distributing compressive forces on the captured axle. In one embodiment of the invention, the wrapper band is formed from confronting U-shaped plates which are compressed around an axle and welded or bolted together. The U-shaped plates have end portions adjacent to each other and welds or mechanical fasteners join the end portions of the U-shaped plates to each other. Preferably, the U-shaped plates extend about 180° around the axle.

In another embodiment of the invention relating to all three forms of the invention, the wrapper band is formed as a single piece, either integrally formed in a single piece or welded into a single piece, and stretched around the axle, preferably while the wrapper band is heated to an elevated temperature. The wrapper band in this embodiment can be polygonal or round in cross section to conform to the cross-sectional shape of the axle on which it is mounted. In a wrapper band of polygonal cross-sectional shape, the radius of curvature of the inner corners can be greater or less than the radius of curvature of the outer corners of the axle. In this embodiment, the wrapper band can be in the form of a uniform thickness band of steel and of uniform length formed in the same cross-sectional shape of the axle with the inner surface of the wrapper band conforming to the outer surface of the axle.

In one embodiment relating to the first form of the invention, the axle is polygonal, for example, square or hexagonal, in cross section, with corners, and the wrapper band inner surface portions are positioned near the corners of the axle. For example, the wrapper band inner surface portions are positioned near the tangent point between the side of the axle and the corner radius. In another embodiment relating to the third form of the invention, the axle is round in cross section and the wrapper band inner surface portions are in contact with the axle around the entire periphery thereof. In all embodiments, the frictional force between the wrapper band and the axle is relatively high, sufficient to prevent relative movement of the wrapper bands with respect to the axle under ordinary service conditions. There is ordinarily direct contact between the compression wrapper band and the axle to maximize the frictional forces between the two. There may be some instances in which a friction enhancing coating is positioned between the wrapper band and the axle. For example, adhesives, paint and thin film fillers can be coated onto the axle outer surface and/or the wrapper band inner surface to increase the contact area between the wrapper band and the axle. In order to achieve these high frictional forces, the tension in the wrapper plates and the wrapper band is preferably in excess of 15,000 psi, preferably in excess of 25,000 psi.

Although the invention contemplates that the frictional forces will be sufficient to maintain a fixed relationship between the axle and the wrapper band, it may be desirable in some cases to add further mechanical connections between the axle and the wrapper bands. For, example, the wrapper bands and, in some cases, the axles can be pierced with through holes for receipt of a pin or washer. When both the axle and wrapper band have apertures in register with each other, a pin can extend through the apertures in friction fit and prevent relative movement of the axle and wrapper band under extraordinary circumstances. In one embodiment, a short pin is used on each side of the axle and wrapper band. The short pin has a hardened, tapered end which is driven into the hole in the axle to wedge the pin in the axle hole. Thus, the diameter of the axle hole is slightly smaller than the diameter of the pin, except for the tapered end portion. The tapered pin compresses the area around the axle hole to strengthen the area. When the wrapper band alone has an apertures, a washer can be placed in the aperture or apertures in tight fit and welded to the axle. In all cases, the apertures in the wrapper band and the axle are preferably placed at a neutral axis of the axle. The apertures in the wrapper band can be of uniform diameter or can be of non-uniform diameter to show movement of the axle with respect to the wrapper band.

The wrapper bands are generally of uniform thickness. However, in one embodiment, the wrapper band has tapered or chamfered inner surfaces at both ends thereof which correspond to the upper and lower portions of the axle to minimize stress risers which may result from the compression of the wrapper band onto the axle at the edges of the wrapper bands. The wrapper bands are typically made of strips of metal plate, for example steel, and have a width of about 2–3 inches and a thickness of about ¾ inch. Thus, the ratio of width to thickness of the wrapper bands is usually at least about 2 and no greater than about 10, although in some circumstances, these ratios may vary.

The wrapper bands provide a situs for the mounting of brake actuators to the suspension through appropriate mounting brackets. Thus, in one embodiment of the invention, a brake actuator is mounted directly to a mounting bracket which is fixed, as by welding, to a wrapper band as described above. The wrapper band mounting the brake actuator can be free of other vehicle components or can mount other vehicle components such as suspension system arms through appropriate suspension brackets. In one embodiment, a brake actuator and an arm of a suspension system through which the axle is mounted to the frame is mounted to a wrapper band and an S-cam bearing for the brake actuator is mounted in an opening in a suspension mounting bracket for the suspension system. The S-cam shaft can be considerably shortened because of the mounting of the S-cam bearing directly to the suspension mounting bracket compared with mounting the brake actuator to a central portion of the axle. Thus, the brake actuator can be mounted to a wrapper band or bands which also mount a trailing arm suspension mounting bracket or be separately mounted to the axle through a separate wrapper band.

At least one of the U-shaped plates have in a preferred embodiment of at least the first and third forms of the invention a pair of ears, one on each end portion thereof, for applying tension to at least one of the U-shaped plates before welding or otherwise joining the U-shaped plates together. Further, in a preferred embodiment of at least the first and third form of the invention, end portions of the U-shaped plates overlap with each other and a weld is positioned at the overlapping end portions of the U-shaped plates.

In a preferred form of the invention, movable arms of the suspension system are mounted to the axle through wrapper bands. Suspension brackets are mounted to the wrapper bands, preferably by welding, and to the arms of the suspension system. The suspension systems contemplated by the invention include trailing arm suspensions in which the arms are typically rigid as well as leaf suspensions in which the wrapper bands are mounted to the leaf springs through appropriate brackets.

In another embodiment of the invention, the vehicle component is a radius rod or a track bar which is mounted to the wrapper band through an appropriate bracket. In other words, a wrapper band according to the invention can have mounted thereto a track bar or radius rod tower bracket. This wrapper band avoids the formation in the axle of stress risers which unavoidably result from welding a track bar or radius rod tower bracket to the axle.

Further according to the invention, a method of mounting a vehicle component to an axle comprises the steps of: providing a bracket plate having an inner surface portion adapted to extend around a portion of an axle and shaped to conform to at least a portion of an external surface portion of the axle; providing a wrapper plate having an inner surface adapted to extend around a portion of the axle and having surface portions shaped to conform to at least another external surface portion of the axle; positioning the wrapper plate in confronting juxtaposition to said bracket plate around said axle; compressing the bracket plate and wrapper plate towards each other to compress the axle between the bracket plate and the wrapper plates; and fastening the bracket plate to the wrapper plate while the bracket plates and wrapper plates are compressed towards each other. Preferably, the bracket plate and the wrapper plate are compressed towards each other at least in part by applying a tensile force to end portions of the wrapper plates whereby the axle is maintained in compression by the tensile forces in the wrapper band after the fastening step. Further, the bracket plate and the wrapper plate have tail end portions which overlap with each other and a weld is positioned at the overlapping tail end portions of the wrapper plate and the bracket plate to fasten the wrapper plate to the bracket plate. In one embodiment of the invention, the wrapper plate and the bracket plate are mechanically fastened together through threaded fasteners.

Further according to the invention, a method of mounting a vehicle component to an axle comprises the steps of providing a hollow band having in inner surface substantially conforming to the outer surface of the axle, heating the hollow band to an elevated temperature to expand the diameter of the inner surface thereof, forcing the hollow band onto the axle while the hollow band is at the elevated temperature, cooling the hollow band, an affixing a vehicle component to the hollow band. The vehicle component can be fixed to the hollow band either before or after the hollow band is pressed onto the axle. The wrapper band compresses the axle and is maintained in a selected position on the axle through the frictional forces between the axle and the wrapper band.

In accordance with the invention, a trailing arm suspension for mounting ground-engaging wheels to a vehicle frame has an axle mounted to a trailing arm through an axle-beam connector. The suspension comprising at least two arms adapted to be secured to opposite sides of the frame and at least one wheel-carrying axle mounted to the arms through an axle-mounting assembly. Each of the axle-mounting assemblies comprises at least one beam-axle connector which is mounted to one of the arms at one end thereof through a bushed connection and is connected to the axle at another end thereof. Each of the arms forms a collar which receives the axle. An elastomeric layer is positioned between the axle and the collar for articulation between the axle and the collar. Preferably, the beam-axle connector is rigidly mounted to the axle at the other end thereof.

In a preferred embodiment of the invention, there are two beam-axle connectors, one on each side of each arm, and each beam-axle connector is connected to the arm and to the axle in the same manner. Further, each of the beam-axle connectors is identical and is symmetrical about a longitudinal axis. Each beam-axle connector is generally triangular in two dimensional configuration and has a reinforcing gusset at an upper portion thereof and at a lower portion thereof. Preferably, each beam-axle connector further includes an arcuate plate at the other end thereof and through which the beam-axle connector is mounted to the axle.

In one embodiment, the beam-axle connector is mounted to the axle through a hollow wrapper band which circumscribes the axle and is under tension sufficient to compress the axle at at least two sets of diametrically opposed and circumferentially spaced external surfaces of the axle and to prevent movement of the axle with respect to the wrapper band under ordinary service conditions. To this end, the arcuate plate extends about 180° around the axle and mates with a second arcuate plate to form a hollow wrapper band which circumscribes the axle and is under tension sufficient to compress the axle at at least two sets of diametrically opposed and circumferentially spaced external surfaces of the axle and to prevent movement of the axle with respect to the wrapper band under ordinary service conditions.

The invention provides for an assembly of an axle to a suspension, preferably a trailing arm suspension, whereby the axle is maintained in a high state of compression essentially sufficient to couple the axle to the axle mounting without any welding between the axle and the wrapper band. The axle is thus stronger because it is not welded to the mounting assembly. However, the axle is maintained in position on the mounting assembly and thus in a fixed position on the trailing arm suspension by frictional forces created by the compression between the mounting assembly and the axle. The axle mounting is stronger than previous system and further is adaptable to automated assembly techniques. Thus, the axle mounting assembly is less expensive to assemble, more reliable in service, longer lived and lower in weight compared to similar strength axle mounting assemblies.

BRIEF DESCRIPTION OF THE DRAWINGS

The invention will now be described in detail with reference to the accompanying drawings in which:

FIG. 7 is a view like FIG. 2 of a second embodiment of the invention adapted for use with a round axle;

FIG. 8 is a sectional view taken along lines 8—8 of FIG. 7;

FIG. 9 is an enlarged view of a portion of the axle mounting assembly shown in FIG. 7;

FIG. 9A is an enlarged view of a portion of an axle mounting assembly like FIG. 9 and showing a modified form of a weld joint;

FIG. 19 is a partial front view of a leaf spring assembly which incorporates an axle mounting assembly according to a seventh embodiment of the invention;

FIG. 26 is a side elevational view, similar to FIG. 20, of a partial axle mounting assembly for an automotive suspension system illustrating a tenth embodiment of the invention;

FIG. 27 is a front elevational view of the axle mounting assembly shown in FIG. 25;

FIG. 51 is a side elevational view of yet another embodiment of a suspension system according to the invention; and FIG. 52 is a perspective view of the suspension illustrated in FIG. 51.

DESCRIPTION OF THE PREFERRED EMBODIMENT

Figure 1:
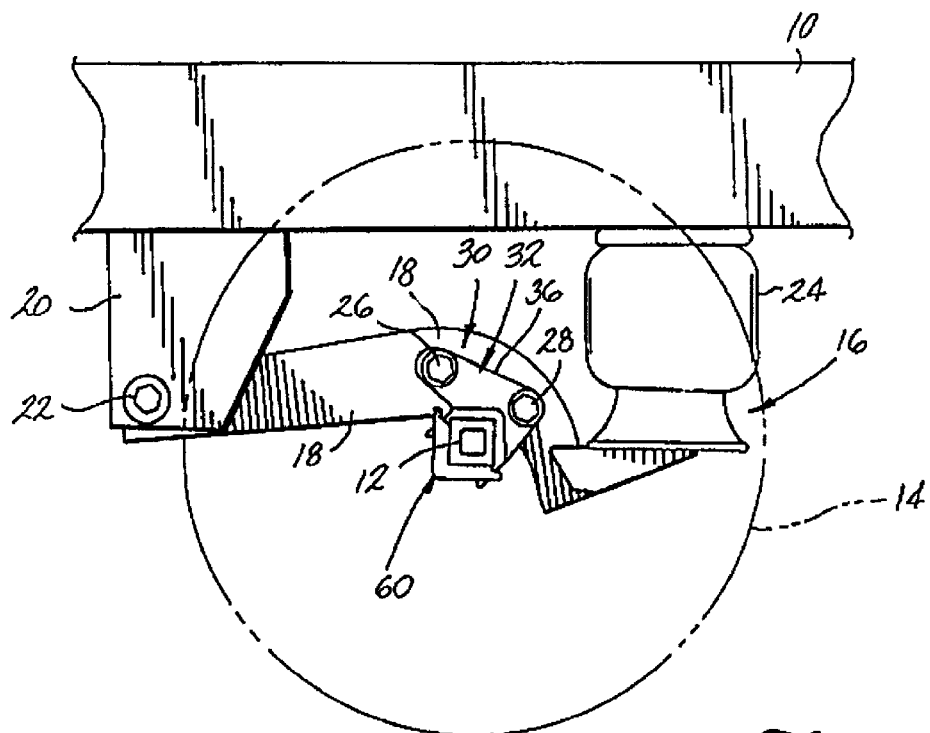
FIG. 1 is a fragmentary, side elevational view of a vehicle frame having mounted thereon a suspension system according to the invention.

Referring to the drawings and to FIG. 1 in particular, a vehicle frame 10 has an axle 12 and ground-engaging wheels 14 (shown in phantom lines) suspended therefrom by a suspension system 16 illustrating a first embodiment of the invention. The front of the vehicle is to the left of the frame as viewed in FIG. 1. Suspension system 16 includes, at each side of the vehicle frame 10, a trailing arm 18 pivotally mounted to a hanger bracket 20 depending from frame 10. The hanger bracket 20 has a pivot pin 22 at the lower end thereof for pivotally supporting the forward end of trailing arm 18. Trailing arm 18 comprises a hollow rectangular member for supporting the axle 12. The forward end of trailing arm 18 is pivotably mounted at pivot pin 22. The trailing arm 18 extends rearward along the vehicle frame 10. The rear end of the trailing arm 18 is secured to an air spring 24. Trailing arm 18 has a slight downward bend intermediate between its forward and rear ends. A forward bushed pin 26 and a rear bushed pin 28 extend through trailing arm 18 near the slight downward bend therein for supporting an axle mounting assembly 30 while permitting limited articulation between the axle mounting assembly 30 and the trailing arm 18. The upper portion of the air spring 24 is fixedly secured to the vehicle frame 10.

In operation, vertical movement of the ground-engaging wheels 14 is translated through axle 12 to the axle mounting assembly 30. Vertical movement of axle mounting assembly 30 is translated to trailing arm 18 through forward bushed pin 26 and rear bushed pin 28. A bushing (not shown) encases each of the bushed pins 26, 28. The limited articulation permitted between axle mounting assembly 30 and trailing arm 18 by the bushing of forward bushed pin 26 and rear bushed pin 28 cushions the vertical movement of the trailing arm 18 and controls the roll rate of the suspension by permitting axle mounting assembly 30 to make small vertical, rotational and conical displacements relative to trailing arm 18.

Significant vertical displacement of axle mounting assembly 30 causes the vertical displacement of trailing arm 18. Vertical movement of trailing arm 18 is permitted by the pivotal connection of the forward end of trailing arm 18 at the pivot pin 22. The vertical movement of trailing arm 18 is cushioned and restrained by air spring 24 and a shock absorber (not shown).

The foregoing description of a trailing arm suspension is for purposes of illustration and is not intended to be a limitation on the types of suspensions on which the axle mounting assembly according to the invention can be used. For example, the axle mounting assembly according to the invention can be used on all different types of trailing arm suspensions, on leaf spring suspensions, and on combinations of the two. Further, the suspensions utilizing the axle mounting assembly according to the inventions can be used on trucks, trailers, buses and other types of heavy-duty vehicles, including off-road vehicles as well as on-road vehicles.

The axle mounting assembly 30 comprises a pair of bracket plates 32, each of which has a plate body 34 with an upper edge 36 and a lower edge 38, a lower corner 40 and an upper corner 42. The lower edge 38 forms a generally L-shape which conforms to two sides of the axle 12 with the upper edge 36 and the lower edge 38 extending around a portion of the upper left and lower right corners of the axle 12 as viewed in FIG. 2.

Figure 2:
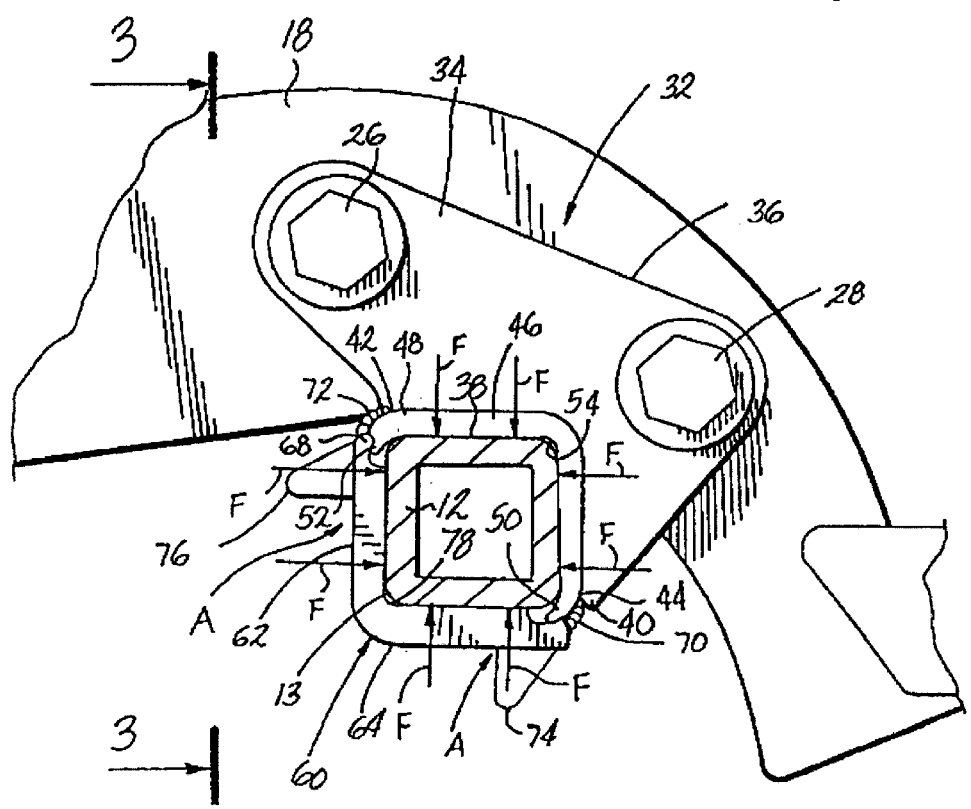
FIG. 2 is an enlarged, fragmentary side sectional view of the suspension shown in FIG. 1.
Figure 3:
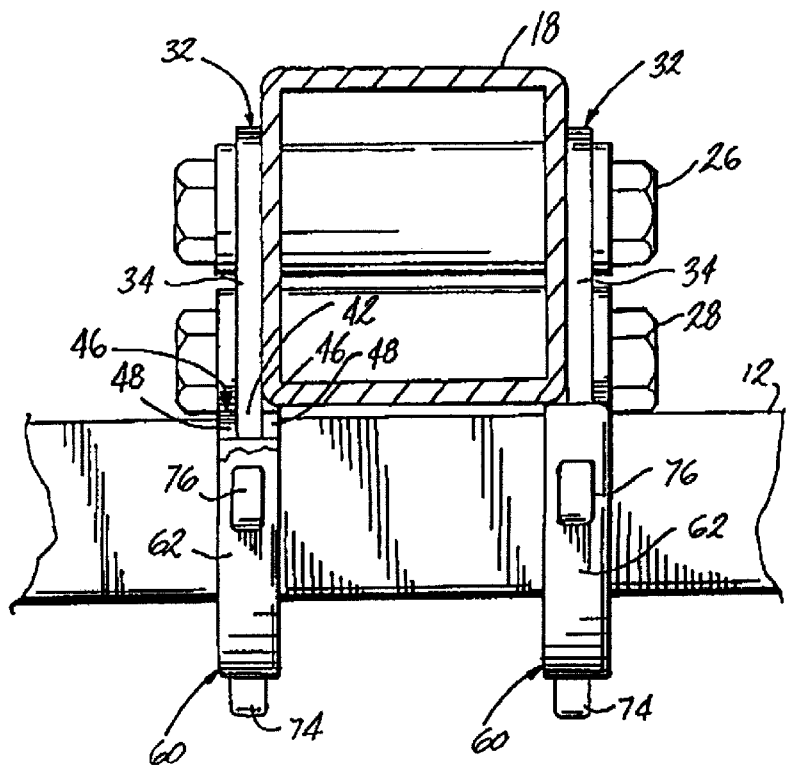
FIG. 3 is a sectional view taken along lines 3—3 of FIG. 2.
Figure 4:
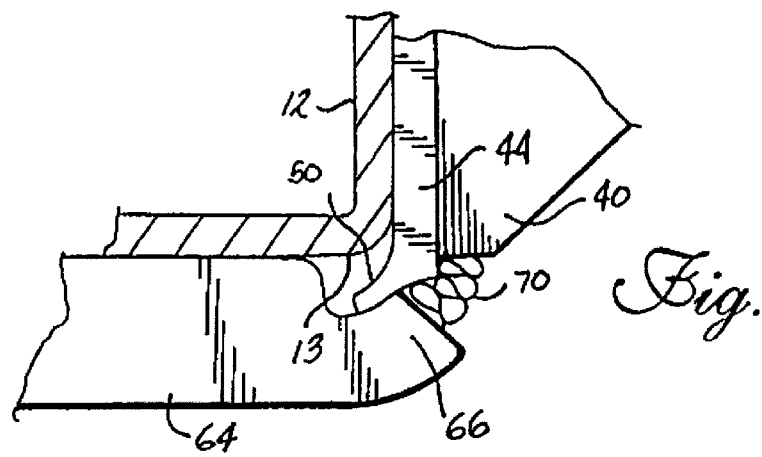
FIG. 4 is an enlarged portion of FIG. 2.
Figure 5:
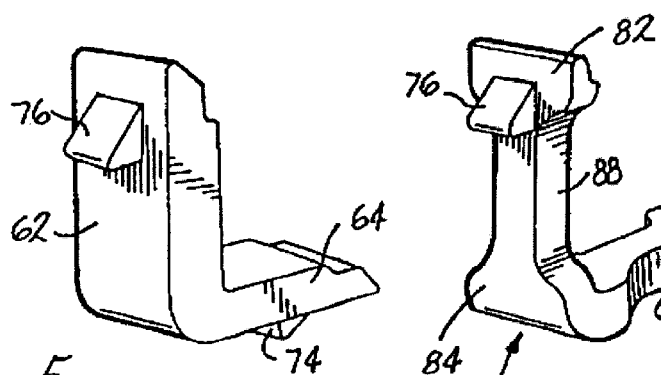
FIG. 5 is a perspective view of a wrapper band which is a part of the axle mounting assembly shown in FIGS. 1 through 4.

A pair of L-shaped flanges 46 extend laterally from the lower edge of the bracket plate body 34 and generally conform to two sides of the axle as shown in FIG. 2. FIG. 3 shows the flanges 46 secured to the bracket plate body 34. The L-shaped bracket plates have an end portion 48 near an upper left corner of the axle 12 and an end portion 44 near a lower right corner of the axle 12, as viewed in FIG. 2. The bracket plates 32 and the flange portion 44 have a tail 50 at the lower corner 40 and a tail 52 at the upper corner. As seen in FIG. 4, the tail 50 is curved slightly. The flanges 46 and the lower edges of the bracket plate body 34 form edge surface portions which are shaped to conform to the axle 12 near the corners thereof. Specifically, the edge surface portions bear against the flat of the axle 12 near the tangent point as illustrated by the force arrows F shown in FIG. 2. The edge surface portions have a radius of curvature at the corner 54 smaller than the radius of curvature of the corner 13 of the axle so that there is a clearance between the two surfaces so that the forces on the axle are applied by the straight portions of the edge surface portions. Alternatively, the flanges 46 can be formed in one piece and welded to the lower edge of the plate body 34. In this alternative construction, the flanges by themselves would form the edge surface portions which are shaped to conform to the axle 12 in the same fashion as the lower surface 36 of the bracket plate body 34 and the L-shaped flanges 46.

An L-shaped wrapper plate 60 generally conforms to the left and bottom sides of the axle 12 as viewed in FIG. 2 and has a vertical arm 62 which extends up along the left side of the axle 12 (as viewed in FIG. 2) and a horizontal arm 64 which extends along the lower wall of the axle 12 (as viewed in FIG. 2). The corner 78 of the L-shaped wrapper plate 60 has a radius of curvature smaller than the radius of curvature of the corner 13 of the axle so that there is clearance between these two corners as illustrated in FIG. 2. This construction results in a compressive force on the axle at the sides near the tangent point of the corner and the corner radius as illustrated by the force arrows F shown in FIG. 2. A tail portion 66 on arm 64 extends beyond the tail 50. The tail portion 66 is bent upwardly at an angle to the horizontal so that the inner edge of the tail portion 66 complements and overlaps the outer edge of the tail 50. The left wrapper plate 60 is broken away in FIG. 3 at an upper end of arm 62 to show the flanges 48 extending laterally from a lower edge of the bracket plate body 34.

The end portion 44 of the L-shaped flanges 46 is welded to the tail portion 66 of the wrapper plate 60 through a weld 70. In like manner, the end portion 48 of the L-shaped flanges 46 is welded to the tail portion 68 of wrapper plate 60 through weld 72. The welds do not touch or reach the axle so that the axle can be mounted to the suspension without welds between the axle and the mounting assembly. As shown in FIG. 3, there is a clearance between the tail 50 and the corner 13 of the axle 12 so that the compressive forces applied by the L-shaped wrapper plate 60 and the lower edges surfaces of the bracket plate body 34 and flanges 46 are substantially near the tangent point of the sides and corner of the axle 12 as illustrated by the force arrows F in FIG. 2.

An ear 76 is formed on an upper outer surface of arm 62. An ear 74 is formed on an outer end portion of the arm 64.

The ears 74 and 76 are triangular in shape but can be any shape so long as they function to provide a gripping abutment for applying a tensile force to the wrapper plate 60. Alternatively, the arms 62 and 64 can be notched in lieu of the ears to form gripping abutments for applying a tensile force to the wrapper plate 60.

The axle mounting assembly is assembled as follows:

An axle 12 is positioned against the lower edge 38 of the bracket plates 32 so that the flange end portions 46 are aligned near the corners of the axle 12. A wrapper plate 60 is then moved into position opposite one of the bracket plates 32. A compressive force is applied between the opposing bracket plate 32 and wrapper plate 60 by applying a downward force against the upper edge 36 of the bracket plate 32 and applying upward forces generally along lines A against the ears 74 and 76 of the wrapper plate 60. The forces A resolve into upward and lateral forces along the, arms 62 and 64 and thereby apply a tension to the wrapper plate 60. The compressive force applied to the bracket plate 32 and wrapper plate 60 are relatively high, for example in the order of about 20,000 lbs. When the desired compressive forces are reached, the bracket plate 32 and the wrapper plate 60 are then joined together through welds 70 and 72. The welds, when cool, will contract and thus at least maintain the compressive force on the axle 12. The combination of the L-shaped wrapper plate 60 and the flanges 46 form a wrapper band which compressibly loads the axle 12 in a relatively uniform manner. The high level of compressive loading of the axle through the axle mounting assembly 30 firmly positions the bracket plates on the axle and prevents the bracket plates from laterally shifting with respect to each other and with respect to the axle 12 during use of the trailing arm suspension. After one set of a bracket plate and a wrapper plate is welded in the foregoing manner, the second set of a bracket plate and a wrapper plate is then welded together to form a second wrapper band on the axle and complete the assembly of the axle mounting assembly to the axle 12. The bracket plates can then be mounted to the trailing arm through the bushed pins 26 and 28.

As shown in FIGS. 2 and 3, the wrapper plate 60 applies a compressive force to the sides of the axle near the tangent point of the flat and corner radius of the axle 12. The wrapper is preloaded onto the axle and then welded together. The radius of the inside corner 54 of L-shaped flange 46 is smaller than the radius of the outside corner 13 of the axle 12 to provide clearance between the two corner surfaces. Likewise, the radius of the inside corner 78 of the L-shaped wrapper plate 60 is smaller than the radius of the outside corner 13 of the axle 12 to provide clearance between the two corner radius surfaces. The same relationship exists between the other corners of the wrapper and the axle.

The manner of welding the L-shaped flange 46 to the L-shaped wrapper plate 60 can vary so long as the weld does not contact the axle. The axle mounting can be one or more bands as desired to connect each trailing arm or other suspension to the axle. The axle connection can be used for many types of suspensions in addition to the suspension shown in FIGS. 1–6. For example, the axle connection of the invention can be used to connect axles to leaf spring suspensions as well as top mount and underslung trailing arm and combination leaf spring and trailing arm suspensions.

As an alternate procedure, the bracket plates 32 can first be mounted to the trailing arm 18 through the bushed pins 26 and 28 and the axle and L-shaped wrapper plates can be assembled to the bracket plate, applying compressive pressure to the bracket plate and/or the trailing arm and the wrapper plate as described above.

The L-shaped wrapper plate 60 is generally elongated in shape and has a width approximately the distance between the ends of the flanges 44, 46 and 48. Thus, there is a substantial contact between the wrapper plate 60 and the axle 12, thereby providing a relatively high frictional force between the two.

Figure 6:
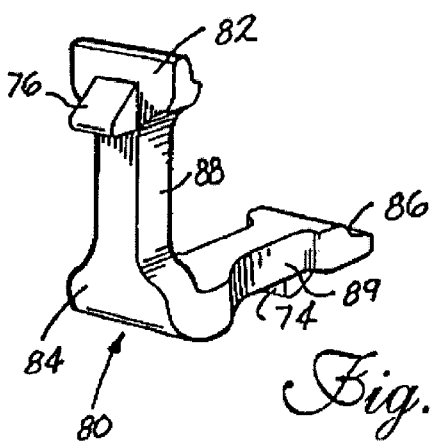
FIG. 6 is a perspective view of an alternate embodiment of a wrapper band used in an axle mounting assembly according to the invention.

FIG. 6 illustrates the alternate embodiment of the L-shaped wrapper plate. The alternate wrapper plate 80 is L-shaped in configuration and has wide flange portions 82, 84 and 86 separated by webs 88 and 89. The L-shaped wrapper plate illustrated in FIG. 6 is substantially the same as the wrapper plate 60 except that there are narrowed web portions 88 and 89 between the flange portions 82, 84 and 86. The flange portions 82, 84 and 86 are adapted to be positioned against the corresponding corners in the upper left, lower left and lower right (as viewed in FIG. 2) of the axle 12.

Reference is now made to FIGS. 7, 8 and 9 which show a second embodiment of the invention wherein an axle mounting assembly is adapted for mounting a round axle 90. A pair of bracket plates 92 are adapted to be mounted to a trailing arm 18 of a trailing arm suspension through bushed pins 26 and 28 in the same fashion as bracket plates 32. The bracket plates 92, however, have a different shape, each being formed with a plate body 94 having an upper edge 96 and a lower flange 98. The lower flange 98 is arcuate shaped, having a lower arcuate surface 100 which conforms to the shape of the outer surface of the axle 90 and an upper surface which is fixed to the lower portion of the plate body 94. The lower flange 98 further has, as shown in FIG. 9, a terminal tail 104 at a lower right portion (as viewed in FIG. 7) and further has a terminal tail 106 at a lower left portion (as viewed in FIG. 7). The flange 98 is preferably formed integral with the plate body 94 by casting or forging on the lower portion of the bracket plate body 94 perpendicular thereto. Alternatively, the lower flange can be formed as a separate plate and welded to the lower portion of the plate body 94.

A pair of U-shaped wrapper plates 110 are mounted to an opposite side of the axle 90 in juxtaposition to the bracket plates 92. Each of the U-shaped wrapper plates 110 has an a lower central bite portion 112, a right leg 114 and a left leg 116 which collectively define an arcuate upper surface 120 which conforms to the outer surface of the axle 90. The central bite portion 112 has an arcuate lower edge 118. A notch 126 is formed in the right leg 114 and a notch 128 is formed in the left leg 116. A tail 130 is formed in the right leg 114 in overlapping relationship to the right tail 104 of flange 98. In like manner, a tail 132 is formed in the left leg and is in overlapping relationship to the left tail 106 of flange 98. A triangular ear 134 is welded to the right leg 114 and a triangular ear 136 is welded to the left leg 116. A weld bead 138 joins the tail 130 to the tail 104 of flange 98. In like manner, a weld bead 140 joins the tail 132 to the left tail 106 of the flange 98. A pocket can be used in lieu of ears 134 on the legs 114, 116 to grip the wrapper plates 110.

The round axle mounting assembly is assembled in substantially the same manner as the square axle mounting assembly 30 identified above. The bracket plates 92 are positioned on the round axle and the U-shaped plates 110 are position in juxtaposed relationship thereto. A compressive force is applied to the U-shaped plates 110 and to the bracket plates 92 of the same order as the compressive force applied to the axle mounting assembly 30. Force is applied to the ears 134 and 136 until such time as an appropriate compressive force is reached. The bracket plates 92 are welded to the U-shaped plates 110 through the fillet welds 138 and 140. The compressive force is then released but the axle remains under compression by the axle mounting assembly. Optionally, the central portions of the arcuate surfaces 100 and 120 can be slightly recessed to permit a slight flexing of the top and bottom of the axle with respect to the lower flanges 98 and the U-shaped plates in service.

An alternate embodiment of the weld joint between the bracket plate 92 and the U-shaped plates is shown in FIG. 9A where like numerals are used to describe like parts. A backing plate 122 is positioned on the axle 90 in recessed areas 123 and 125 of the terminal tail 104 of the lower flange 98 and the right leg 114' of wrapper plate 110, respectively. Each of the ends of the terminal tail 104 and the right leg 114' are chamfered to form a notch in which a weld bead 138 is placed to secure the wrapper plate 110 to the lower flange 98.

Figure 10:
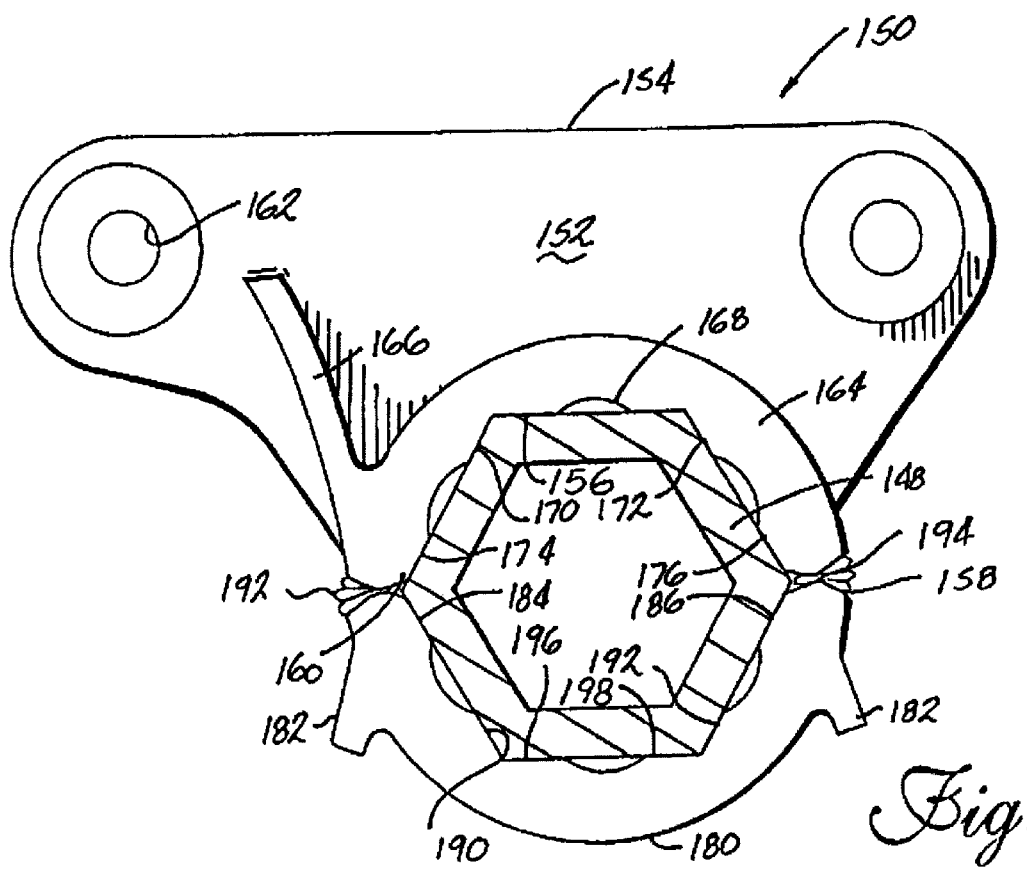
FIG. 10 is a view like FIG. 7 of a third embodiment of the invention.
Figure 11:
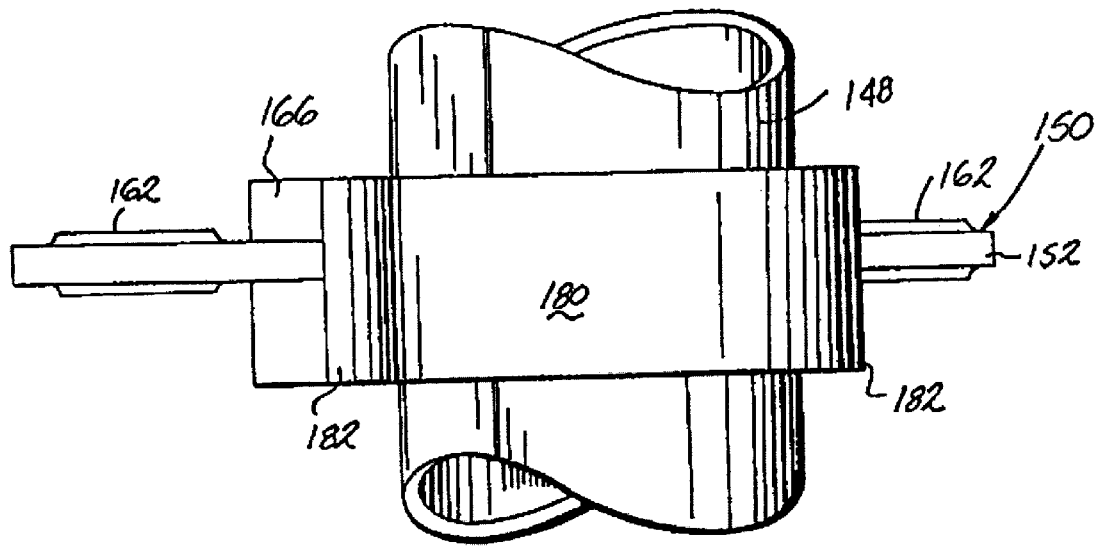
FIG. 11 is a bottom view of the axle mounting assembly shown in FIG. 10.

Referring now to FIGS. 10 and 11, there is shown a third embodiment of the invention wherein an axle mounting assembly is provided for a hexagonal axle 148. The axle 148 is hexagonal in cross section, having six sides and six corners.

The axle mounting assembly comprises a bracket plate 150 having a plate body 152, an upper edge 154, a lower edge 156 and lower corners 158 and 160. Bushed openings 162 are provided in conventional fashion in the plate body 152.

A pair of semicircular flanges 164 are welded or cast to each side of the plate body. A brace flange 166 extends upwardly from a lower left side of the semicircular flange 164 toward the left bushed opening 162 as viewed in FIG. 10. A similar flange of mirror image construction is mounted to the other side of plate body 152. The semicircular flanges 164 have a central inner surface 168 which is spaced from the upper surface of the axle 148 and has an upper left pressure surface 170, an upper right pressure surface 172, a lower left pressure surface 174 and a lower right pressure surface 176, all in bearing relationship to the hexagonal axle near the corners thereof.

A U-shaped plate 180 is positioned beneath the axle 148 and has a pair of integrally formed ears 182 (or pockets) for applying pressure to the wrapper band during assembly of the wrapper band to the bracket plate 150. The U-shaped plate has an upper left pressure surface 184, an upper right pressure surface 186, a lower left pressure surface 190, a lower right pressure surface 192, a bottom left pressure surface 196 and a bottom right pressure surface 198, all in bearing relationship to the hexagonal axle near the corners thereof. A left weld 192 and a right weld 194 secure the U-shaped plate 180 to the bracket plate 150. The welds 192 and 194 do not extend to the axle 148. The compressive pressure applied by the semicircular flange 164 and the U-shaped plate 180 is applied to the side walls of the axle 148 adjacent to but not at the corners in a manner similar to the compressive forces applied to axle 12 by the axle mounting assembly illustrated in FIGS. 1–4 and described above.

Figure 12:
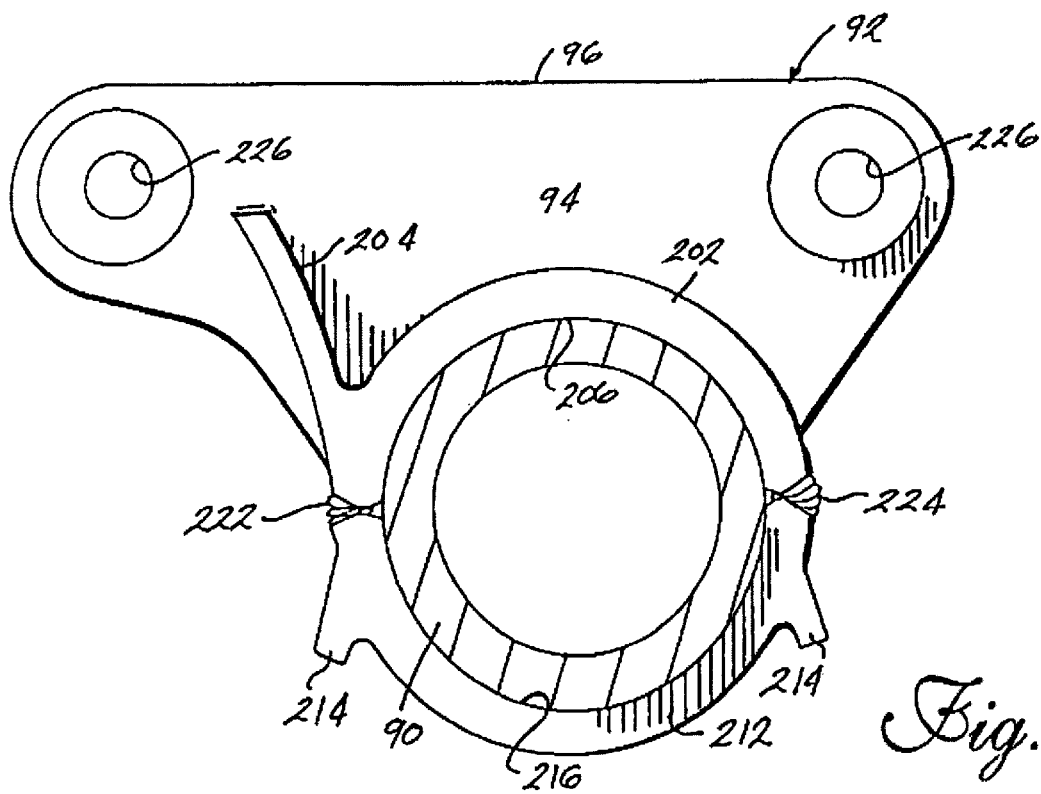
FIG. 12 is a side elevational view, like FIG. 2, of a fourth embodiment of a suspension system according to the invention and illustrating a mounting plate assembly for a round axle.
Figure 13:
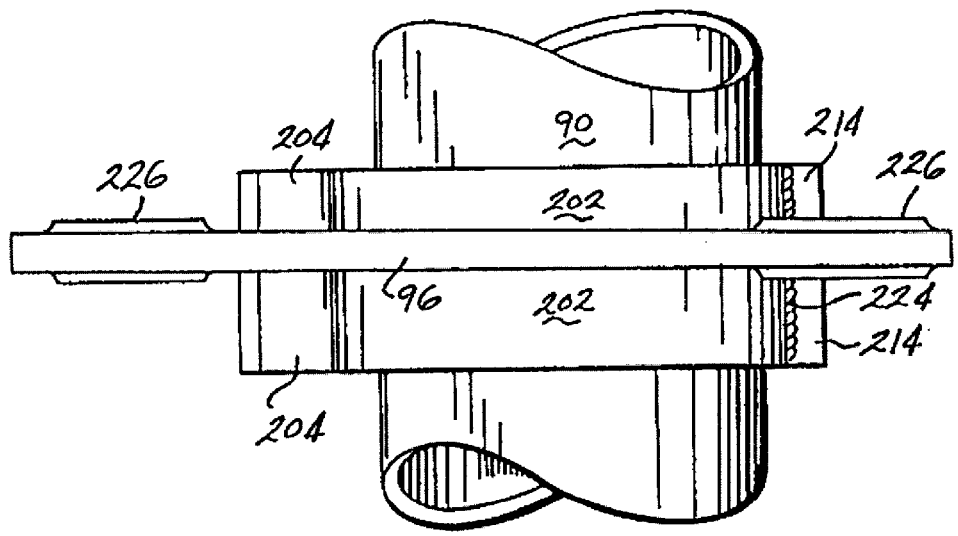
FIG. 13 is a top view of the mounting plate assembly and axle shown in FIG. 12.

Reference is now made to FIGS. 12 and 13 which show a fourth embodiment of the invention. Like numerals have been used to designate like parts. A bracket plate 92 comprises a plate body 94 having an upper edge 96. A semicircular flange 202 is welded or cast to each side of the plate body 94. A brace flange 204 extends upwardly from a lower left side of the semicircular flange 202 (as viewed in FIG. 12) toward a left bushed opening 226. A right bushed opening 226 is also provided on the plate body 94 in conventional fashion. The semicircular flanges 202 have a lower inside surface 206 which is arcuately shaped to conform to the outer surface of the axle.

A U-shaped plate 212 is mounted beneath the round axle 90 and has a pair of integral ears 214 (or pockets) formed therein for applying an upward force to the outer portions of the U-shaped plate 212 for applying tension thereto in the assembly of the axle mounting assembly in a manner discussed above. The U-shaped plate has an inner surface 216 which is arcuately shaped to conform to the shape of the outer surface of the axle 90. A left weld 222 and a right weld 224 secure the U-shaped plate 212 to the bracket plate 92. As in the other embodiments, a relatively high force is applied to the upper edge 96 of the plate body 94 and/or to the flanges 202 on one side of the axle and substantial forces are likewise provided at the ears 214 (or pockets) on the U-shaped plate 212 to compress the axle prior to welding the U-shaped plate 212 to the bracket plate 92 through the welds 222 and 224. The semicircular flanges 202 and U-shaped plate 212 apply a relatively evenly distributed compressive force to the axle 90 through the arcuate surfaces 206 and 216, respectively.

Figure 14:
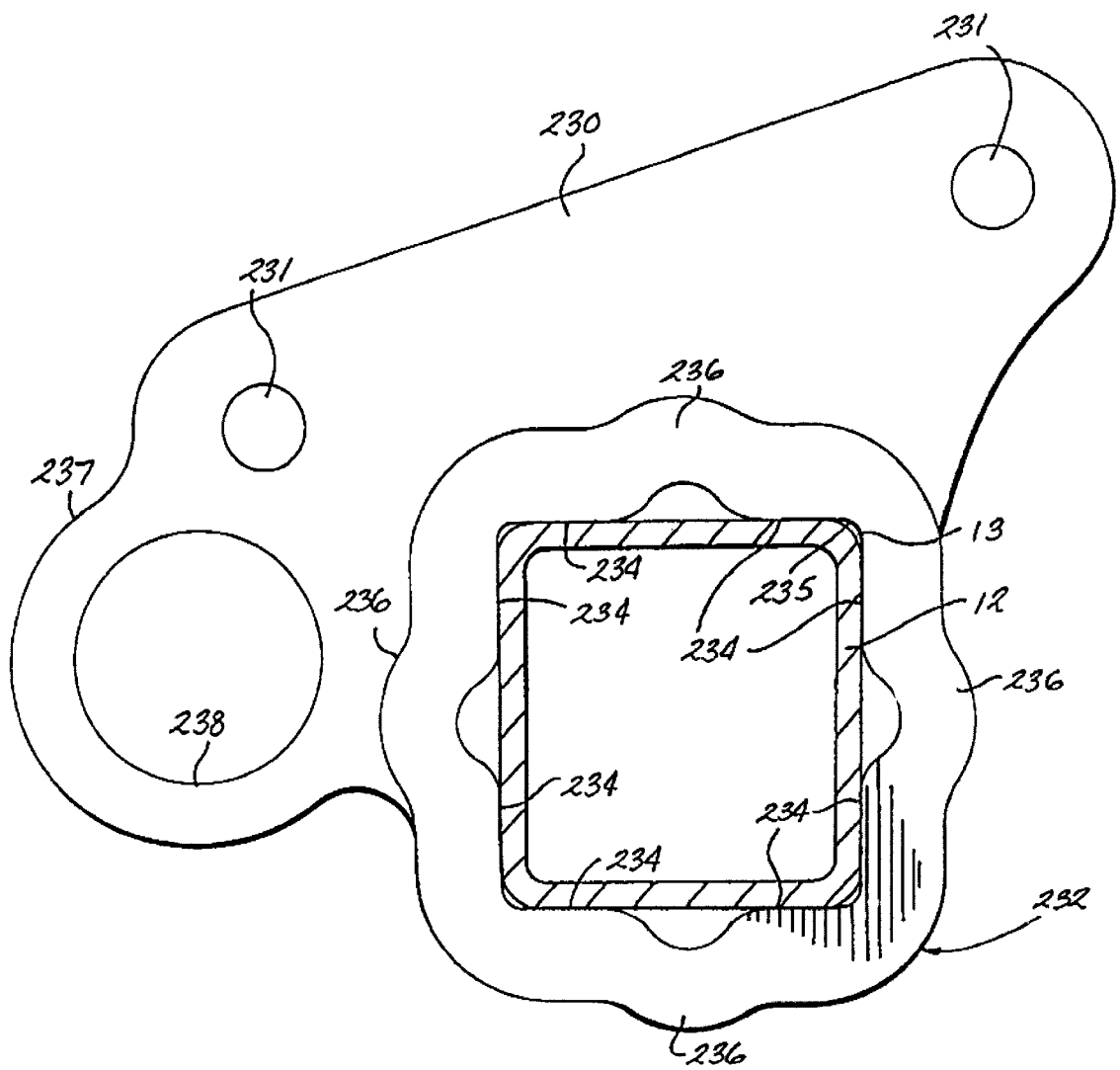
FIG. 14 is a side elevational view, similar to FIG. 2, of a mounting plate assembly for an automotive suspension system illustrating a fifth embodiment of an axle mounting assembly according to the invention.
Figure 15:
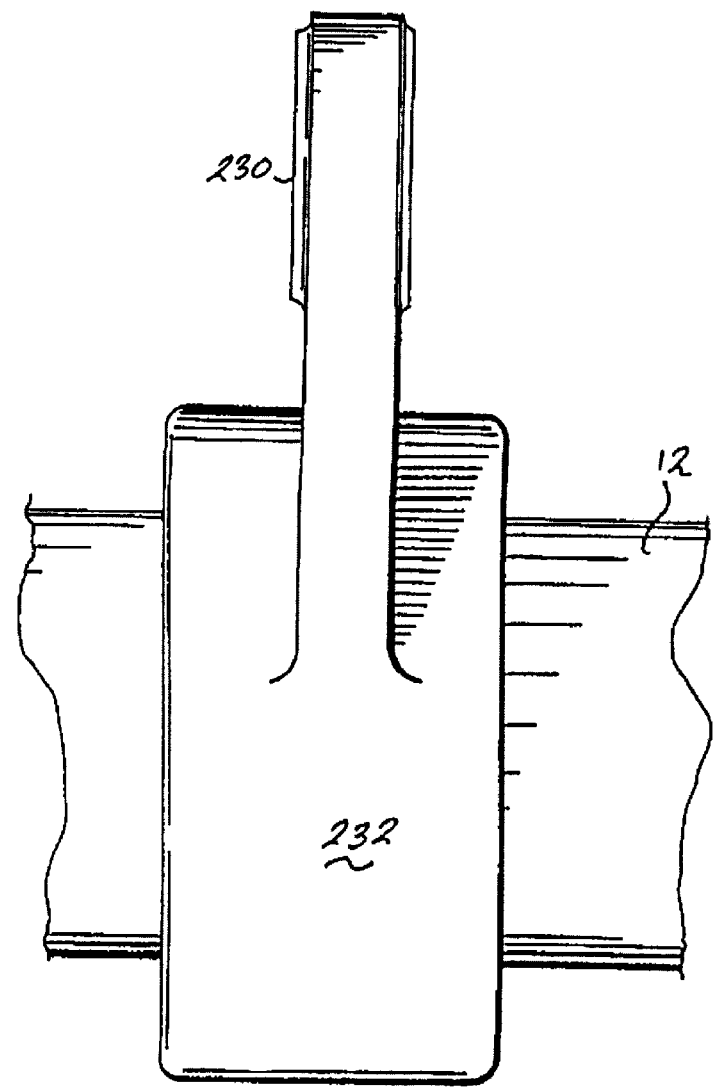
FIG. 15 is a front view of the axle mounting assembly shown in FIG. 14.

Referring now to FIGS. 14 and 15, there is shown a fifth embodiment of an axle mounting assembly according to the invention. A bracket plate 230 mounts a hollow rectangular prismatic wrapper band 232. The wrapper band 232 can be welded to plate 230 as an integral piece which extends on either side of plate 230 or can be integrally formed with the plate 230 by casting or by forging. The wrapper band 232 has eight inner pressure surfaces 234 which bear against and compress a square axle 12. These pressure surfaces 234 load the axle near the tangent point of the flat sides and corner radius of the axle 12. As shown in FIG. 14, the radius of curvature of the inside corner 235 is smaller than the radius of curvature of the outside corner 13 of the axle 12 so that there is clearance between the two radius surfaces. The wrapper band 232 further has on each side a central wave portion 236 which assists in flexing of the walls of the wrapper band. There are typically four of the wrapper bands 232, two at each end of the axle to attach the wrapper bands to a suspension. The square axle can also be loaded on the corners. This concept also applies to other axle shapes such as hexagonal and round shapes.

The bracket plate 230 has a pair of mounting holes 231 through which the bracket plate and thus the axle 12 can be mounted to a suspension system, such as a trailing arm suspension or any other type of suspension. An S-cam bearing mounting flange 237 is formed on the bracket plate 230 and has an opening 238 therein for mounting an S-cam (not shown) to the bracket plate 230. The mounting flange 237 provides support for the S-cam bearing of the brake actuator. The brake chamber bracket can also be attached to the wrapper band 232 or to the bracket plates and eliminates the need to weld the actuator mounting bracket to the axle.

The wrapper band 232 is press fit onto the axle 12 and can be preheated to aid in shrinking it onto the axle. Thus, the wrapper band 232 compresses the axle 12 at the eight pressure surfaces.

Figure 16:
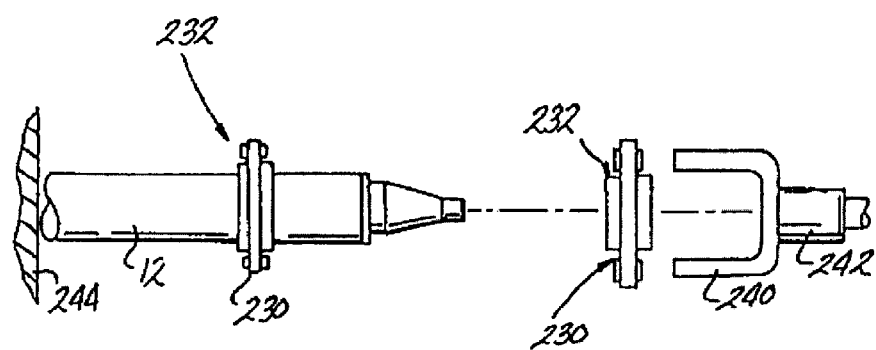
FIG. 16 is a schematic view of a method of assembling the fifth embodiment of the invention illustrated in FIGS. 14 and 15.

Referring now to FIG. 16, there is shown a method of assembling the bracket plate 230 and wrapper band 232 onto an axle 12. The axle 12 is mounted on a support 244. The adapter plate 230 and the wrapper band 232 are heated to an elevated temperature to expand the same. The bracket plate and wrapper band are heated as high as possible without changing the crystal structure of the metal which is preferably steel or ductile iron. The temperature typically is below the austenitic range for the steel which is used for the bracket plate and wrapper band. The thus-heated bracket plate 230 and wrapper band 232 are placed in a fixture 240 which is mounted to a press 242. The press forces the hollow rectangular prismatic wrapper band 232 onto the axle 12 and into a properly aligned position. Four such bracket plates and wrapper bands are forced onto an axle 12 to complete the assembly.

Whereas the embodiment shown in FIGS. 14–16 illustrates a square axle and a square prismatic wrapper band, the axle can be round, rectangular, hexagonal, D shape, oval, octagonal or any other common shape in cross section and the wrapper band can conform to the shape of the axle in a manner analogous to the square axle and square prismatic wrapper bands 32 illustrated in FIGS. 14 and 15.

Although the invention has been described with respect to one trailing arm in a suspension, it is to be understood that each suspension includes a pair of trailing arms, one on each side of the vehicle. Thus, there are four axle mounting assemblies on each axle, two on each end, with one mounting assembly on each side of a trailing arm 18. Further, whereas the invention has been described with reference to an axle mounting assembly for round, square and hexagonal axles, the invention is equally applicable to axle mounting assemblies for other shape axles. For example, the invention is also believed to be suitable for axles which are octagonal in cross section. Assembly of octagonal axle support assemblies would follow the same procedure as for axles which are square, round or hexagonal in cross section. The invention is applicable to axles of all cross-sectional shapes.

Figure 17:
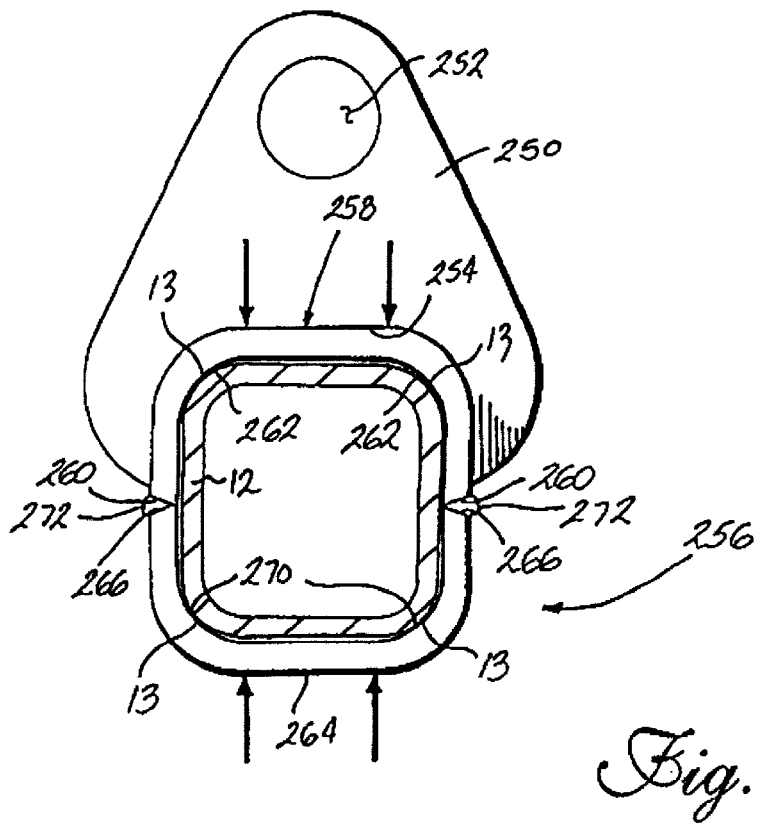
FIG. 17 is a side elevational view, similar to FIG. 2, of an axle mounting assembly for an automotive suspension system illustrating a sixth embodiment of an axle mounting assembly according to the invention.
Figure 18:
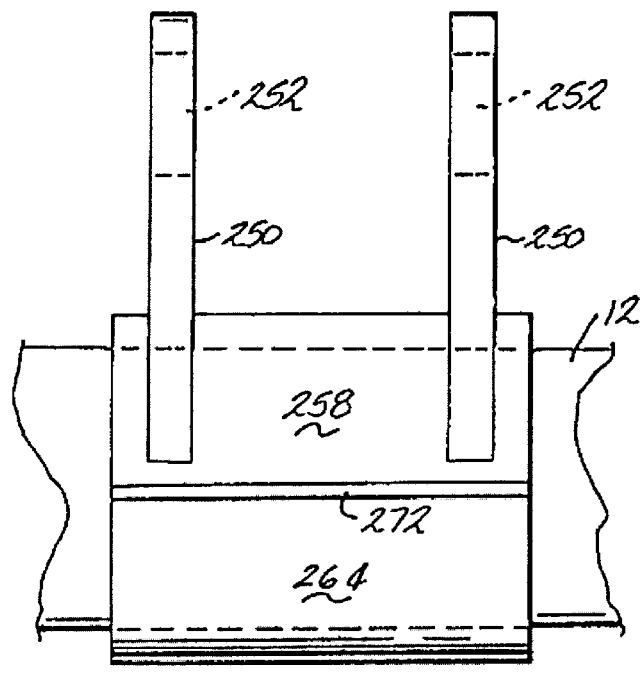
FIG. 18 is a front view of the axle mounting assembly shown in FIG. 17.

Referring now to FIGS. 17 and 18, there is shown a sixth embodiment of a axle mounting assembly according to the invention. A pair of mounting plates 250 have mounting holes 252 for mounting the plates to a trailing arm suspension or to another type of suspension. The mounting plates 250 have a U-shaped opening 254 in which is received the upper portion of a wrapper band 256. The wrapper band 256 comprises a U-shaped upper portion 258 and a U-shaped bottom portion 264 which are fitted together at ends 260 and 266, respectively, and welded together at the ends 260 and 266 through welds 272. The U-shaped upper portion has inside corners 262 which have a radius of curvature greater than the radius of curvature of the external corners 13 of the rectangular or square axle 12. Likewise, the inside corners 270 of the U-shaped bottom portion 264 have a radius of curvature greater than the radius of curvature of the external corners 13 of the axle 12. Thus, there is some clearance between the straight sides and bite portions of the U-shaped upper portion 258 and the U-shaped bottom portion 264 and the sides of the axle 12.

The wrapper band is mounted to the axle through compressive forces which are applied to the U-shaped upper portion 258 and the U-shaped bottom portion 264 at the arrows illustrated in FIG. 17 before the welding operation. The welds are made while the U-shaped upper portion 258 and the U-shaped bottom portion 264 are compressed towards each other so that the axle 12 is in compression. After the welds cool, the preloading in the axle remains with the sides of the U-shaped upper and bottom portions 258 and 264 which have a high tensile loading. Further, the shrinkage of the welds further increases the compressive forces on the axle by the wrapper band 256. As illustrated, the compressive forces on the axle 12 are applied at the corners 13 of the axle by the corners 262 and 270 of the wrapper band 256.

Referring now to FIG. 19, there is shown a seventh embodiment of the invention wherein an axle mounting assembly as shown in FIGS. 17 and 18 is mounted to a leaf spring suspension. Like numerals have been used to described like parts in FIGS. 17 through 19. The leaf spring suspension is shown only in partial form, showing the spring suspension end 280 comprising leaf springs 282, 284 and 286 and an end cap 288. An elastomeric pad 290 is positioned between the cap and the leaf spring 284. The leaf spring 286 has an opening 292 in which is mounted a pin 294 in conventional fashion. The wrapper band 256 is substantially identical with the wrapper band disclosed in FIGS. 17 and 18 but does not have the mounting plates 250. Instead, it is mounted to the end cap 288 with bolts. The wrapper band 256 is assembled to the axle in the same manner as described above with respect to FIGS. 17 and 18. After assembly of the wrapper band to the axle, the wrapper band is then bolted to the end cap 288.

Figure 20:
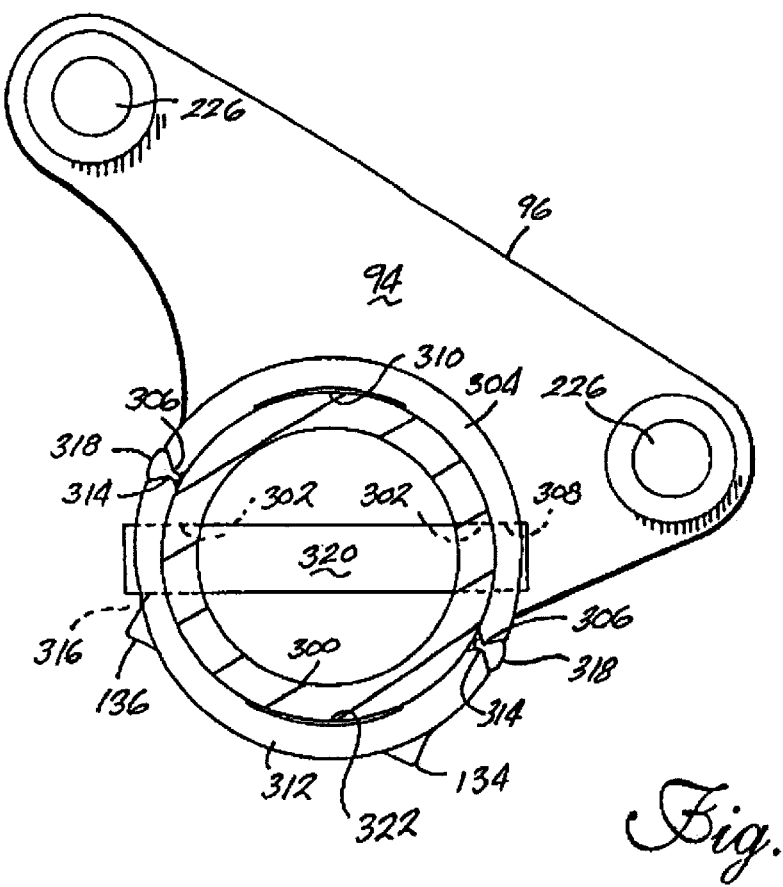
FIG. 20 is a side elevational view, similar to FIG. 12, of a partial axle mounting assembly for an automotive suspension system illustrating an eighth embodiment of an axle mounting assembly according to the invention.
Figure 21:
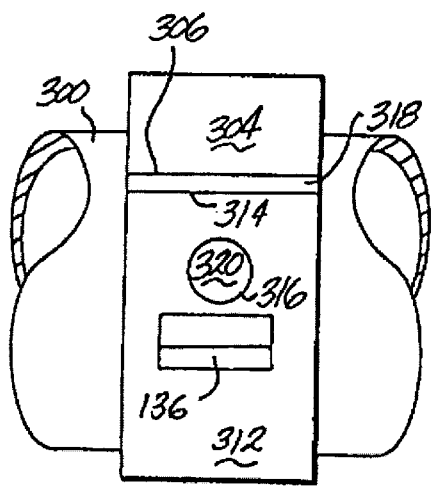
FIG. 21 is a front view of the axle mounting assembly shown in FIG. 20.
Figure 22:
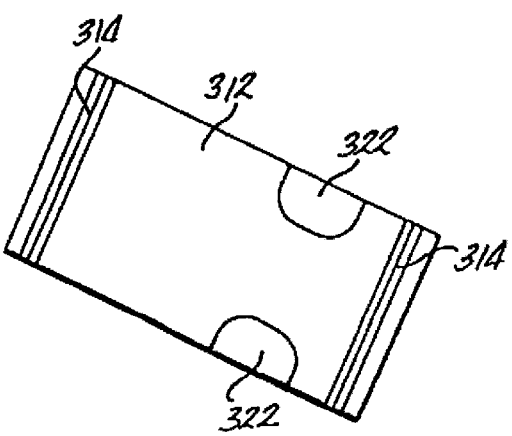
FIG. 22 is a plan view of a component of the axle mounting assembly illustrated in FIGS. 20 and 21.

Reference is now made to FIGS. 20, 21 and 22 which show an eighth embodiment of the invention and like numerals have been used to designate like parts. An axle 300 has circular openings 302 on a horizontal centerline or neutral axis of the axle. A wrapper band comprises an upper U-shaped plate 304 and a lower U-shaped plate 312 which are welded together at lower edges 306 and upper edges 314 of the upper and lower U-shaped plates 304 and 312, respectively, through welds 318. The upper U-shaped plate 304 has a chamfered relief area 310 near each longitudinal edge which provides a slight relief to the axle at the lateral edges of the upper U-shaped plate 304. In a similar manner, the lower U-shaped plate 312 has a chamfered relief area 322 at the lateral edges thereof. The chamfered relief areas 322 are positioned adjacent the bottom of the axle 300. The chamfered relief areas 310 are positioned at the top of the axle. These chamfered areas prevent stress risers in the axle which may result from the lateral edges of the U-shaped plates 304 and 312 during vertical bending of the axle. The chamfered areas are desirable in some instances but they are not essential for the invention. The upper and lower U-shaped plates 304 and 312, respectively, are compressed in the same manner as described above with respect to the other embodiments for the welding operation. After the welding operation and after cooling of the welds, the wrapper band compresses the axle and distributes the compressive forces substantially uniformly around the axle. Typically, the compressive force is sufficient to prevent the wrapper band from sliding on the axle. The wrapper band is then attached to a suspension system in a manner described above. As in the embodiment of FIGS. 7–9, ears 134 and 136 are provided on the lower U-shaped plate 312 to assist in applying the compressive forces to the upper and lower U-shaped plates 312 and 304.

It may be desirable in some cases to incorporate a safety mechanism to make certain that the axle does not move with respect to the wrapper bands. In the embodiment illustrated in FIGS. 20 through 22, the upper U-shaped plate 304 is provided with a circular opening 308 which is in register with one of the circular openings 302. The lower U-shaped plate 312 has an opening 316 which is in register with the other of the circular openings 302 in the axle 300. A drive pin 320 has an exterior diameter substantially equal to the interior diameter of the circular openings 302, the circular opening 308 and the circular opening 316. After assembly of the wrapper plate to the axle 300, the drive pin 320 is driven through the openings 316, 302 and 308 and remains fixed in this position during the service life of the axle. The pin effectively prevents any rotational as well as longitudinal movement of the axle with respect to the wrapper band in the event that the axle experiences any unusual torsional or longitudinal forces which tend to overcome the frictional forces between the wrapper band and the axle.

Figure 23:
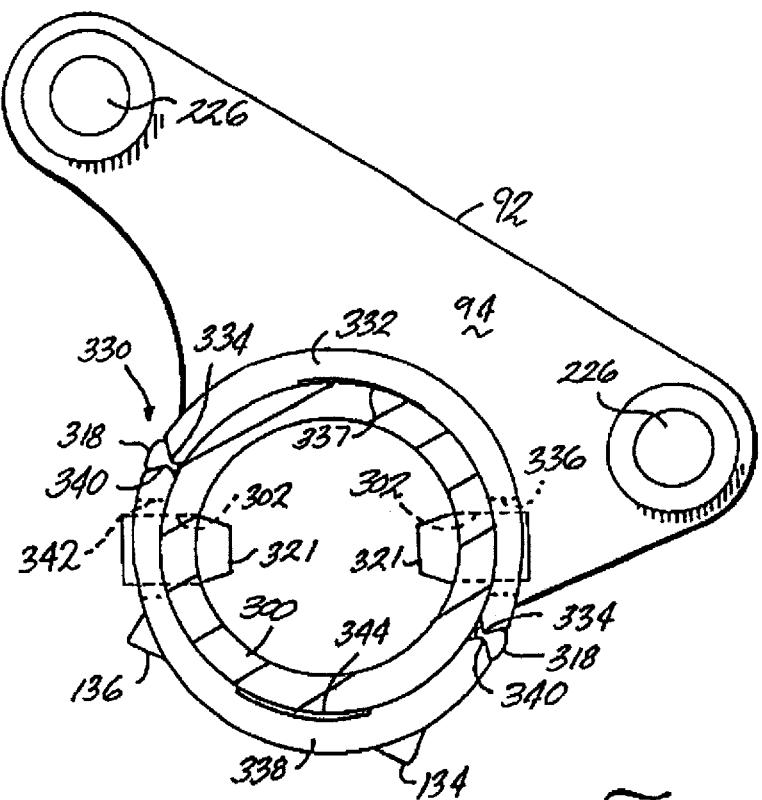
FIG. 23 is a side elevational view, similar to FIG. 20, of a partial axle mounting assembly for an automotive suspension system illustrating a ninth embodiment of the invention.
Figure 24:
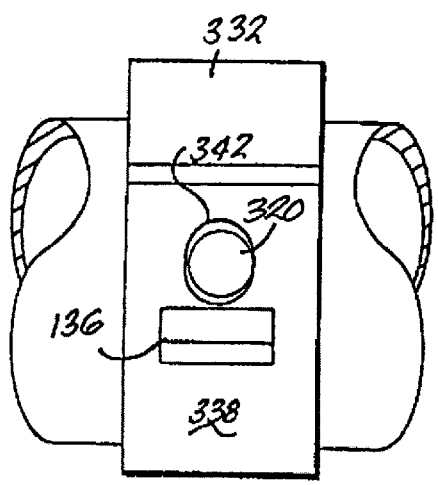
FIG. 24 is a front elevational view of the axle mounting assembly shown in FIG. 23.
Figure 25:
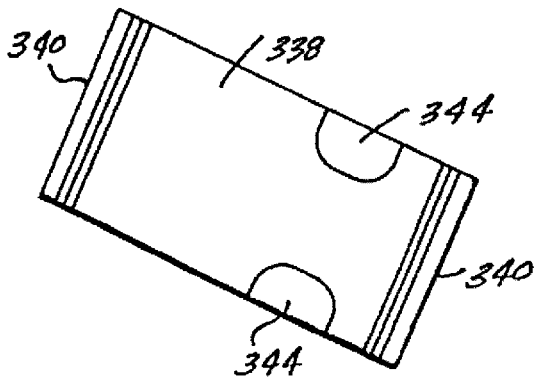
FIG. 25 is a plan view of a component of the axle mounting assembly shown in FIG. 23.

Referring now to FIGS. 23 through 25, there is shown a ninth embodiment of the invention where like numerals have been used to designate like parts. A wrapper mounting band 330 comprises an upper U-shaped plate 332 and a lower U-shaped plate 338 which are joined together at lower edges 334 and upper edges 340 through welds 318 in the same manner as described above with respect to the previous embodiment. The upper U-shaped plate 332 has chamfered relief areas 337 which are positioned at the top of the axle 300. Likewise, the lower U-shaped plate 338 has chamfered relief areas 344 which are positioned at the bottom of the axle 300. As in the previous embodiment, the axle 300 has circular openings 302.

The upper U-shaped plate 332 has an oblong opening 336 in register with one of the opening 302 in the axle 300. Likewise, the lower U-shaped plate 338 has an oblong opening 342 in register with the other of the circular openings 302 in the axle 300. Oblong openings 336 and 342 have a greater diameter in a circumferential direction rather than an axial direction as illustrated in FIG. 24. The axial diameter of the openings 336 and 342 is essentially identical with the diameter of the circular openings 302 in the axle 300. A unitary drive pin (not shown) can be positioned through the openings 342, 302 and 336 as a safety feature to prevent any inadvertent lateral movement of the axle 300 with respect to the wrapper mounting cylinder 330. A tapered drive pin 321, shorter than the integral drive pin 320 of the embodiment shown in FIGS. 20–22, is positioned in each of the sides of the axle 300 and is wedged in the openings 302, thereby compressing the metal around the openings 302, and extend through the oblong openings 336 and 342. The diameter of the drive pin increases from the tapered end to a diameter slightly greater than the diameter of the openings 302. The oblong openings 336 and 342 provide a clearance between the upper and lower surfaces of the drive pins and the wrapper mounting cylinder 330. Thus, a slight amount of proportional movement between the axle 300 and the wrapper mounting cylinder 330 is possible with this embodiment of the invention. Preferably, the drive pins 321 are welded to the upper and lower U-shaped plates 332 and 338 at the respective oblong openings 336 and 342, respectively.

As in the previous embodiments, the U-shaped plates 332 and 338 are preloaded onto the axle 300 before the welding operation using the ears 136 and 138 (or pockets) on the lower U-shaped plate 138 and using the upper edge 96 of the bracket plate 92. The resulting wrapper mounting band 330 exerts a substantial compressive force on the axle 300 to maintain the fixed mounting relationship between the axle 300 and the wrapper mounting cylinder 330 during the service life of the axle.

Referring now to FIGS. 26 and 27, there is shown a tenth embodiment in which like numerals have been used to describe like parts. In this embodiment, an axle 90 has a cylindrical wrapper identical with the wrapper disclosed in FIGS. 20 through 22. The U-shaped plates 304 and 312 are preloaded onto the axle 90 in the same fashion as they are preloaded onto the axle 300 in the embodiment of FIGS. 20 through 22 and are welded during the preloading to compress the U-shaped plates 304 and 312 around the axle 90. In the embodiment shown in FIGS. 26 and 27, a washer 350 is snugly positioned in each of the openings 316 and 308 and is welded to axle 90 through a plug weld 352. The washer and plug weld perform substantially the same function as the drive pin in embodiment of FIGS. 20 through 22 in that they prevent inadvertent translation of the axle 90 with respect to the wrapper band. The washer and weld are not essential to the operation of the invention but merely provide a safety feature which may be desirable in certain applications to avoid any relative movement between the wrapper band and the axle due to extraordinary forces on the axle with respect to the wrapper band.

Figure 28:
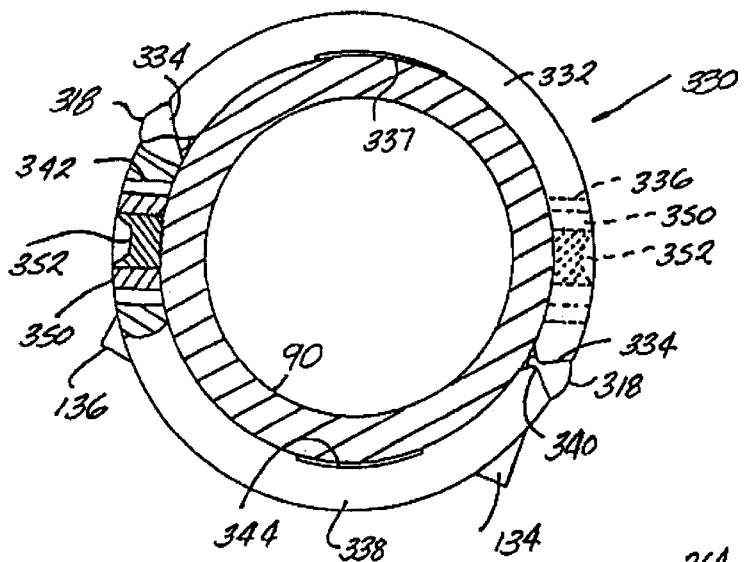
FIG. 28 is a side elevational view, similar to FIG. 20, of a partial axle mounting assembly for an automotive suspension system illustrating an eleventh embodiment of the invention.
Figure 29:
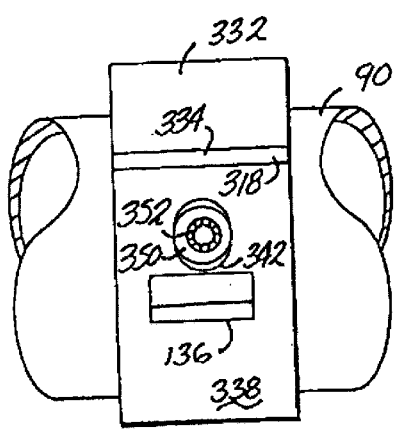
FIG. 29 is a front elevational view of the axle mounting assembly shown in FIG. 25.

Referring now to FIGS. 28 and 29, there is shown an eleventh embodiment of the invention in which like numerals have been used to describe like parts. In FIG. 28, a round axle has a wrapper mounting cylinder 330 of the same construction illustrated in FIGS. 23 through 25. In the embodiment shown in FIG. 28, a washer 350 is positioned within each of the oblong holes 342 and 336 and is welded to the axle through a plug weld 352 as in the embodiment of FIGS. 26 and 27. In this embodiment, the oblong holes 342 and 336 provide a measure of clearance between the upper and lower portions of the washer 350 and the wrapper mounting cylinder 330. The wrapper band 330 is mounted to the axle 90 in the same fashion as the wrapper band 330 is mounted to the axle 300 as described above with respect to FIGS. 23 through 25.

Figure 30:
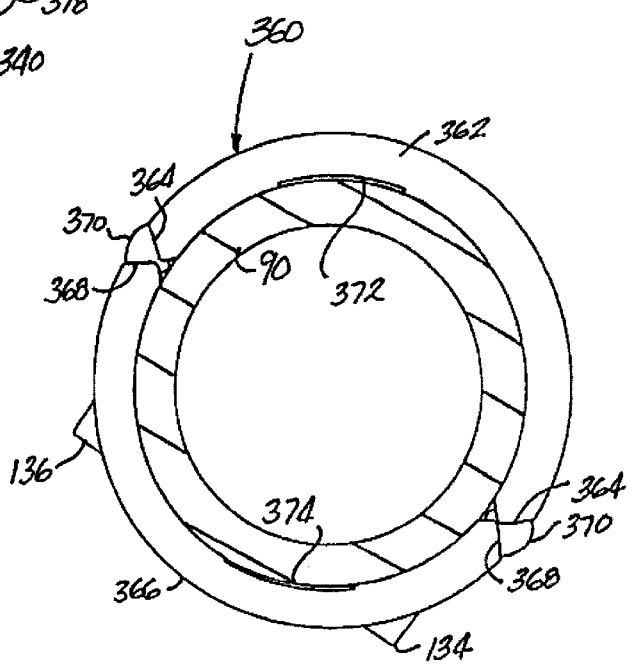
FIG. 30 is a side elevational view, similar to FIG. 20, of a partial axle mounting assembly for an automotive suspension system illustrating a twelfth embodiment of the invention.

Referring now to FIG. 30, there is shown another form of a wrapper band and round axle according to the invention. In this embodiment, the axle 90 has a wrapper band 360 formed from an upper U-shaped plate 362 having lower edges 364 and a lower U-shaped plate 366 having upper edges 368. The upper and lower U-shaped plates 362, 366 conform to the shape of the axle 90 and are compressed together before joining the two U-shaped plates together through welds 370 at the lower edges 364 and the upper edges 368. The upper U-shaped plate has a chamfered relief area 372 at both ends in the same manner as shown in FIG. 22 to relieve stress on the axle upper portion at the edges of the U-shaped plate. Likewise, the lower U-shaped plate 366 has a chamfered relief area 374 at each end to relieve stress on the axle bottom portion at the edges of the plate 366. The wrapper band of this embodiment functions essentially the same as the wrapper bands shown in the previous embodiments to compress and retain the axle in a relatively fixed relationship with respect to the wrapper band during normal service of the axle on a suspension system without welding of the axle bracket or wrapper band to the axle.

The invention contemplates the development of frictional forces between the wrapper bands and the axles sufficient to fix the axles to the wrapper bands and to the suspension arms without welding on the axle. Thus, it is contemplated that these frictional forces will be generated with metal-to-metal contact and without any intervening layers, for example, rubber. However, it is within the scope of the invention to use an adhesion promoting compound or filler, such as Loctite, which is an anaerobic liquid which cures in air to promote adhesion between the confronting metal surfaces. A primer paint can also be used. These compounds may increase the coefficient of friction between the contacting metal surfaces of the wrapper band and axle.

The invention contemplates the use of an axle shape which is round, slightly elliptical or egg-shaped. A slight elliptical configuration can be imparted to the axle by compressing the axle slightly or in the forming process. The slight elliptical configuration to the axle can assist in preventing the axle from rotating about its longitudinal axis with respect to the wrapper band. An axle which is egg-shaped in cross section would have the same result.

The axles typically have a uniform wall thickness. However, the invention also can be used for mounting axles which have non-uniform wall thicknesses. For example, when an axle is made in two parts and welded together at the side, the upper portion of the axle may have a thinner wall thickness than the lower portion. Axles of this configuration can be mounted on suspension systems in accordance with the invention.

The invention also contemplates that the wrapper band can be made in a "C" shape instead of in two pieces. The confronting edges of the "C" can be joined after assembly of the wrapper band to the axle and drawing the edges of the "C" shaped band together by welding or mechanical fasteners.

The invention has been described in part with respect to a wrapper band formed of two parts welded together in tension along common axially extending confronting edges. Although welding alone is a preferred form of joining the parts of a wrapper band, the two parts can be joined in tension by mechanical fasteners such as bolts which extend through ears on the parts. Still further, the two parts can be joined together by a combination of mechanical fasteners and welding.

Figure 31:
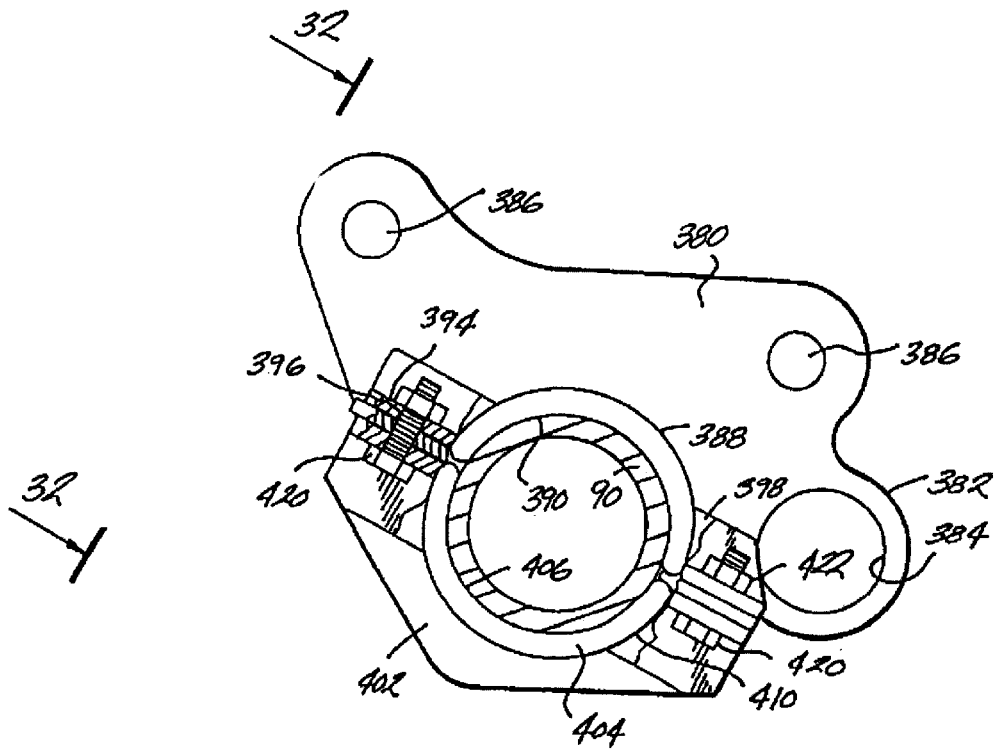
FIG. 31 is a side elevational view of an axle mounting assembly according to a thirteenth embodiment of the invention.
Figure 32:
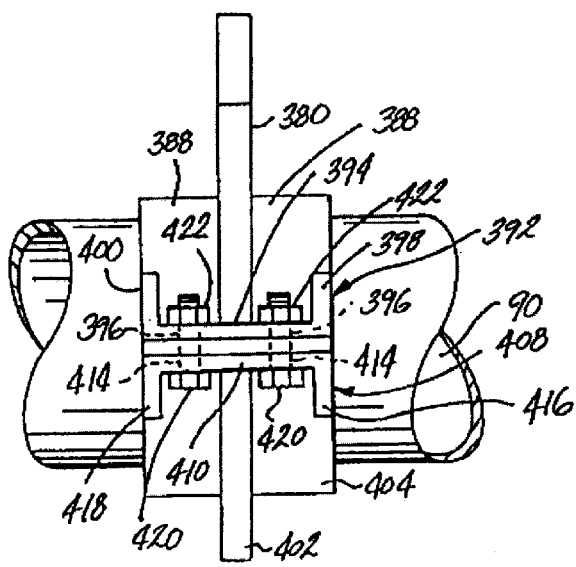
FIG. 32 is an end elevational view as seen along lines 32—32 of FIG. 31.

Referring now to FIGS. 31 and 32, there is illustrated an embodiment of the invention in which the two portions of the wrapper band are joined together by mechanical fasteners. A bracket plate 380 has an S-cam mounting flange 382 with an aperture 384 and mounting apertures 386, the latter of which are used to mount the bracket plate 380 to a trailing arm suspension in the manner illustrated in FIGS. 1–3. The bracket plate 380 further has an upper U-shaped flange 388 with a lower semicylindrical surface 390 in contact with the outer surface of axle 90. A pair of U-shaped plates 392 are mounted to the front and back portions of the bracket plate 380 and have a central portion 394 with openings 396 and end flanges 398. In FIG. 31, the end flange on the left-hand side of the bracket plate 380 is broken away to show the openings 396 in one of the plates 392.

A lower bracket plate 402 has a lower U-shaped flange 404 with a semicylindrical surface 406. The semicylindrical surfaces 406 and 390 are in contact with the outer surface of the axle 90. A pair of U-shaped plates 408 are mounted in inverse position to the front and back edges of the bracket plate 402 and have a central portion 410 with a pair of bolt openings 414. End flanges 416 and 418 are formed on the outer ends of the central portion 410. Bolts 420 extend through the openings 414 and 396 and draw the U-shaped plates 392 and 408 tightly together by threading a nut 422 on the ends of each of the bolts 420.

As illustrated in FIG. 31, the central portions 394 and 410 of the U-shaped plates 392 and 408, respectively, are spaced from each other as are the ends of the U-shaped flanges 388 and 404. Thus, as the bolts 420 are tightened, the U-shaped flanges 388 and 404 are tightened onto the outer surface of the axle 90 to compress the axle 90 and to frictionally mount the bracket plate 380 and the bracket plate 402 to the axle 90. The bolts are tightened sufficiently so that the axle will be held torsionally and axially by the U-shaped flanges 388 and 404 during service operation of the axle.

The axle mounting assembly illustrated in FIGS. 31 and 32 are mounted to a trailing arm suspension, for example, of the type illustrated in FIGS. 1–3. Two of the axle mounting assemblies are mounted onto each axle 90 at each trailing arm 18 (FIGS. 1–3). Four such axle mounting assemblies are mounted onto each axle with two axle mounting assemblies mounted onto each trailing arm.

Figure 33:
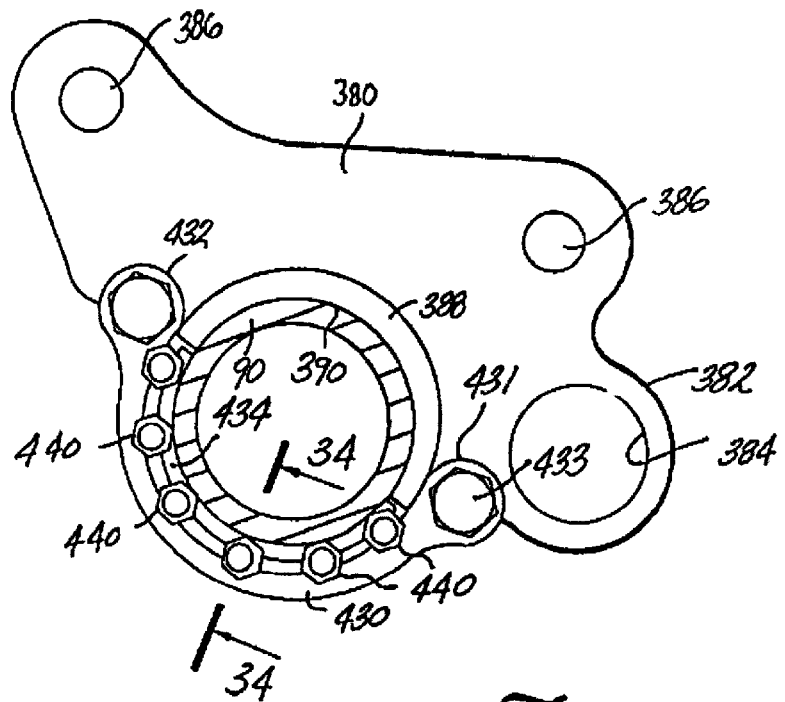
FIG. 33 is a side elevational view of an axle mounting assembly according to a fourteenth embodiment of the invention.
Figure 34:
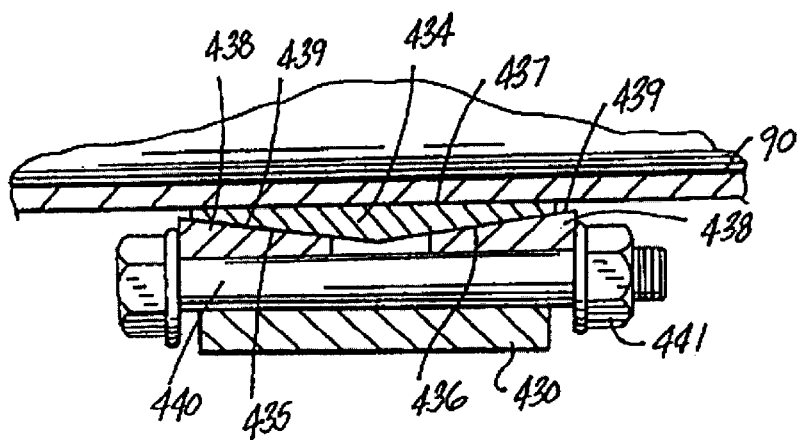
FIG. 34 is a partial sectional view taken along lines 34—34 of FIG. 33.

FIGS. 33 and 34 illustrate yet another embodiment of the invention in which the two portions of the wrapper band are mechanically secured together to frictionally join the axle mounting bracket to the axle. With reference now to FIGS. 33 and 34, where like numerals have been used to describe like parts, bracket plate 380 of substantially identical nature to the bracket plate 380 shown in FIGS. 32 and 31 has an S-cam mounting flange 382 with an aperture 384 and mounting apertures 386. An upper U-shaped flange 388 has a semicylindrical lower surface which is in frictional contact with an outer surface of the axle 90. The bracket plate 380 further has a pair of openings (not shown) adjacent the ends of the upper U-shaped flange 388 for receipt of bolts described hereinafter.

A U-shaped outer band 430 has ends 431 and 432 with holes (not shown) to receive bolts 433 to bolt the outer band 430 to the axle plate 380. The bolts 433 extend through the openings (not shown) in the bracket plate 380.

An inner band 434 has ramped surfaces 435 and 436 and a semicylindrical surface 437, the latter of which is in frictional contact with the outer surface of the axle 90. Wedges 438 having upper ramped surfaces 439 are U-shaped in nature and are positioned adjacent the ramped surfaces 435 and 436 of the inner band 434 as illustrated in FIG. 34. Bolts 440 having nuts 441 extend between the wedges 438 and the outer band 430 to force the surface 437 of the inner band 434 into frictional contact with the outer surface of the axle 90. Further, tightening of the bolts 440 results in tension in the outer band 430 which in turn will apply uniform compressive forces along the surface 437 of the inner band 434. At the same time, the U-shaped flange 388 is drawn in tension and compresses the semicylindrical surface 390 against the outer surface of the axle 90. In this manner, the axle is compressively clamped between the upper U-shaped flange 388 and the lower inner band 434.

Typically, there are two such mounting assemblies at each of the trailing arms in a manner illustrated in FIG. 3, and there are typically two trailing arms on each suspension. Thus, there are four such axle mounting assemblies illustrated in FIGS. 33 and 34 on each axle.

The invention also contemplates the attachment of brake actuator components to the axle mounting plates to avoid mounting of the brake components directly to the axle. The mounting bracket for the actuator chamber can be mounted to the axle mounting assembly. Mounting of the S-cam bearing and the actuator mounting bracket to the axle mounting assembly will avoid welding of the brake actuator mounting bracket to the axle itself and shortens the S-cam shaft, thereby saving weight and cost as well as reducing a potential crack initiation site on the axle.

Figure 35:
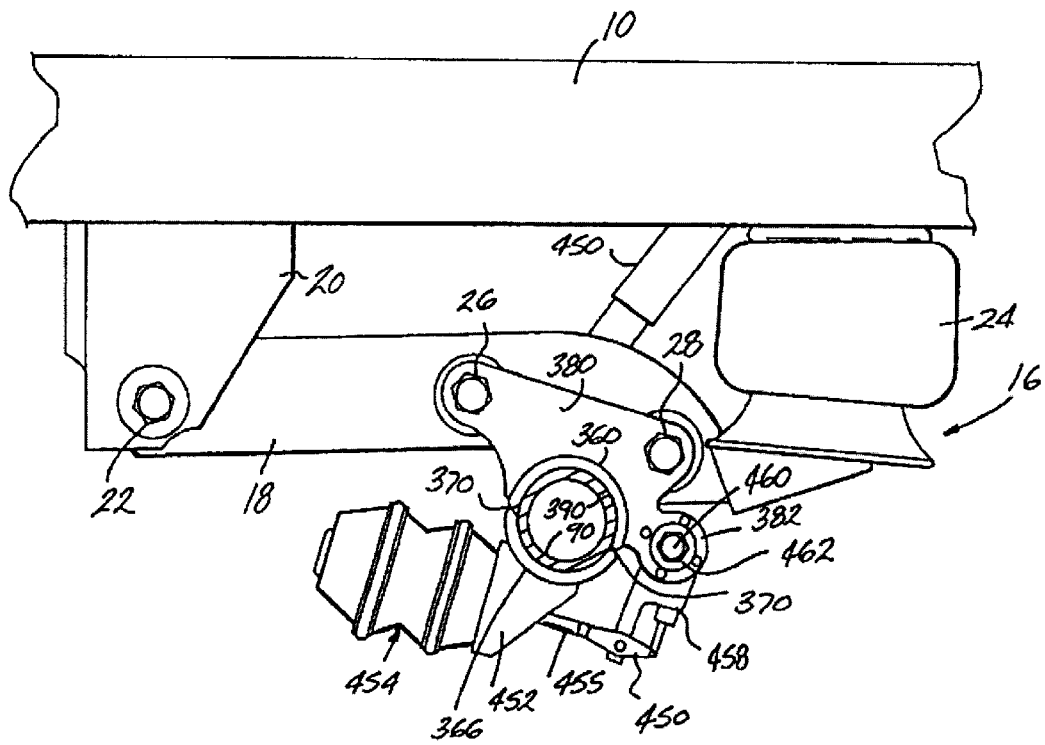
FIG. 35 is a side elevational view of a suspension system according to a fifteenth embodiment of the invention, illustrating the mounting of a brake actuator to the axle mounting assembly according to the invention.
Figure 37:
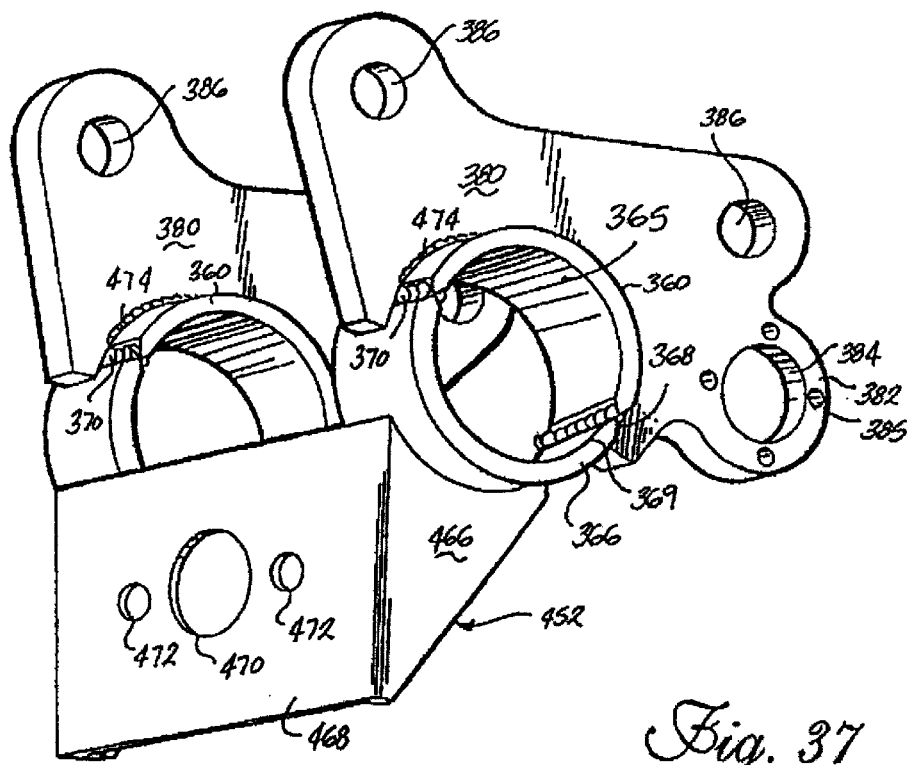
FIG. 37 is a perspective view of the axle mounting assembly together with an actuator mounting bracket illustrated in FIGS. 35 and 36.
Figure 36:
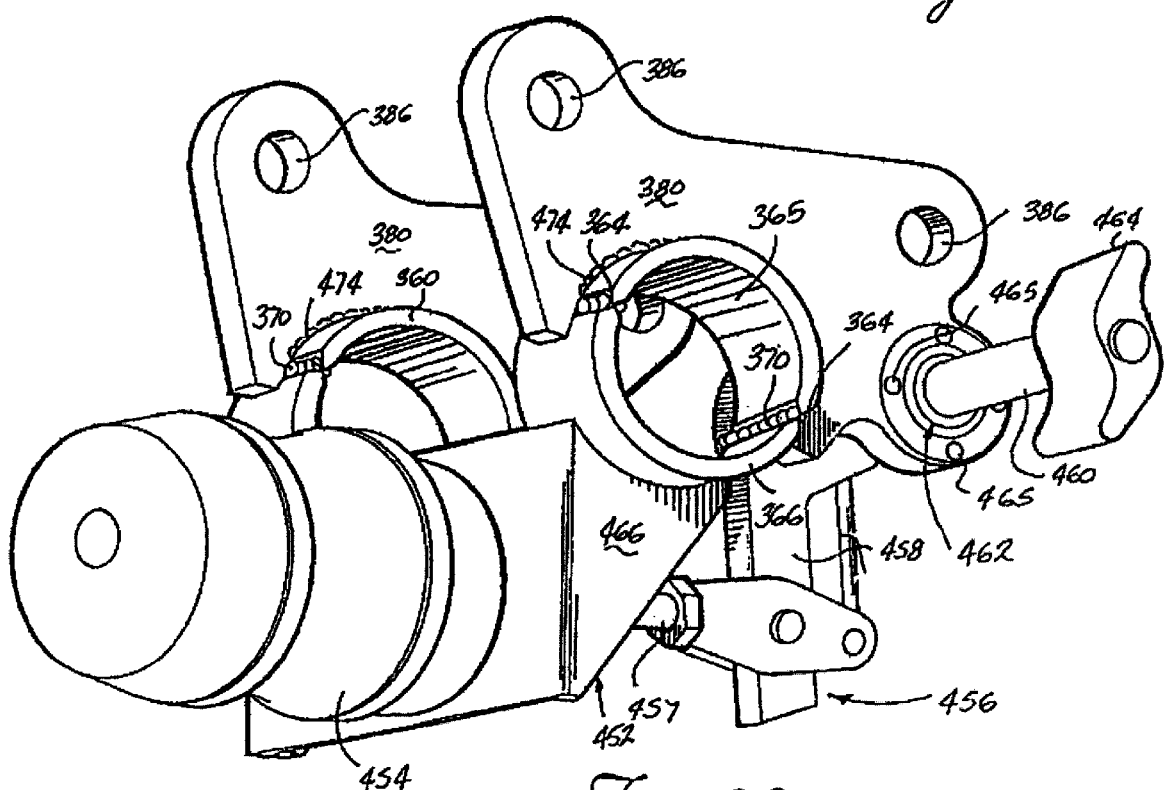
FIG. 36 is a perspective view of the axle mounting assembly and brake actuator illustrated in FIG. 35.

Reference is now made to FIGS. 35–37 which show an axle mounting assembly according to the invention and a brake actuator mounted to the axle mounting assembly. Like numerals have been used to designate like parts. The suspension system is the same as illustrated in FIGS. 1–3. A conventional shock absorber 450 is pivotably mounted at one end to the frame 10 and at another end to the trailing arm 18. The bracket plate 380 is mounted to the trailing arm through bushed pins 26 and 28. An upper U-shaped wrapper plate 360 having lower edges 364 is welded to the bracket plate 380 through suitable welds 474 (FIG. 37) or cast to plate 380. The welds 474 appear on both sides of the bracket plate. As shown in FIG. 37, the upper U-shaped plate 360 extends laterally from each side of the bracket plate 380 to provide a semicircular surface 365 to bear against the outer surface of the round axle 90. A lower U-shaped plate 366 having upper edges 368 has a semicylindrical inner surface 369 (FIG. 37) which bears against the outer surface of the mount axle 90. The upper and lower U-shaped plates 360 and 366 are joined through a weld 370 after being pressed together in a manner described above to apply compression to the axle 90.

As illustrated in FIGS. 36 and 37, there are two axle mounting assemblies at each of the trailing arms. A brake actuator chamber bracket 452 is mounted to each of the lower U-shaped plates 366 in a pair of axle assemblies as illustrated in FIGS. 36 and 37. The brake actuator chamber bracket 452 comprises a pair of triangular side plates 466 and a rectangular end plate 468. A central opening 470 and a pair of bolt openings 472 are formed in the rectangular end plate 468. A brake actuator chamber 454 is mounted to the brake actuator chamber bracket 452 through bolts (not shown) which extend through the bolt openings 472 in the rectangular end plate 468. An actuator rod 455 extends from the brake actuator chamber and is connected to a slack adjuster 456 which in turn mounts a crank arm 458. An S-cam shaft 460 is rigidly connected to and is rotatably driven by the crank arm 458. The S-cam shaft mounts an S-cam 464 and is journaled in an S-cam bearing 462. The S-cam bearing 462 is mounted to the bracket plate 380 through bolts 465 which extend through bolt openings 385 in the bracket plate 380. The brake actuator comprising the brake chamber 454, the actuator rod 457, the slack adjuster 456, the crank arm 458, the S-cam shaft 460 and the S-cam 464 are all conventional and operate a brake on a wheel in conventional fashion. However, the mounting of the S-cam bearing and the brake chamber 454 to the axle mounting assembly is new and avoids welding of these components to an axle.

Figure 38:
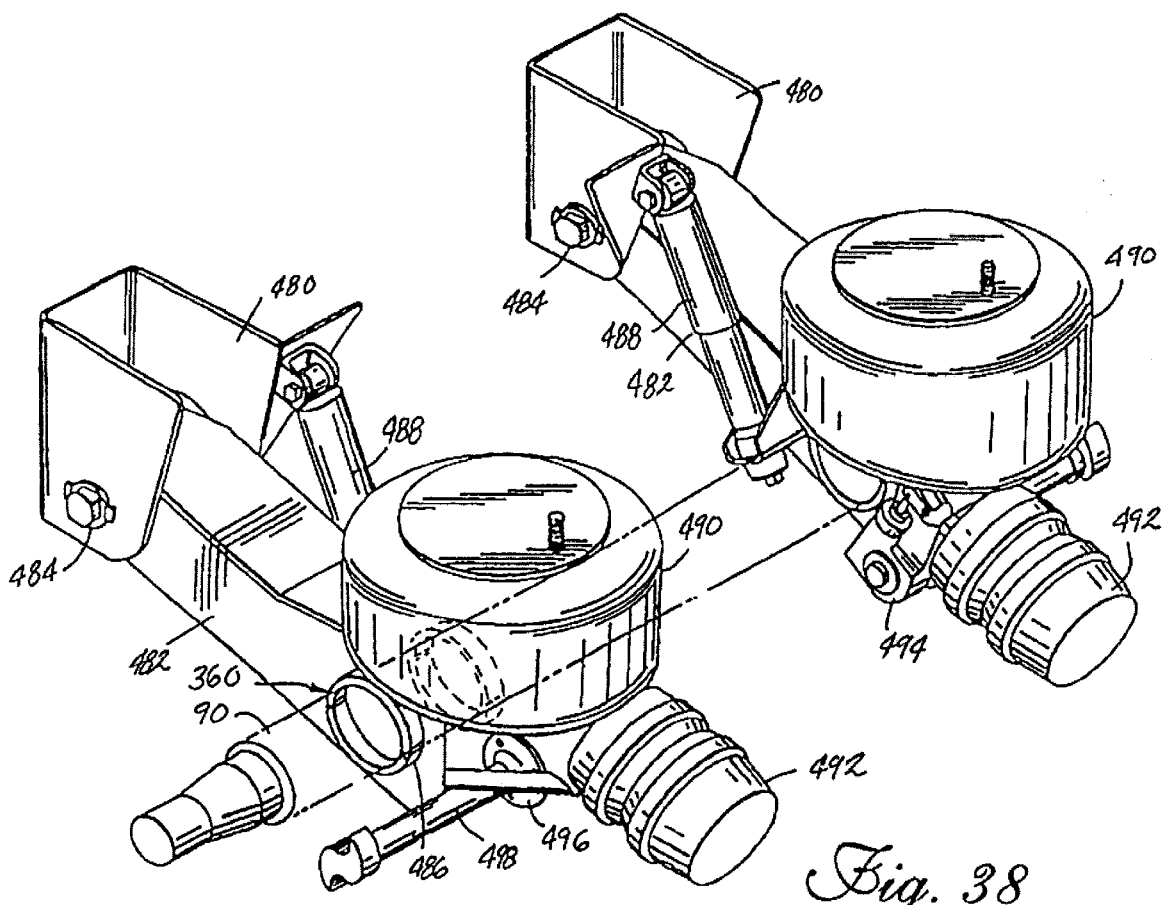
FIG. 38 is a perspective view of a suspension system according to a sixteenth embodiment of the invention.
Figure 40:
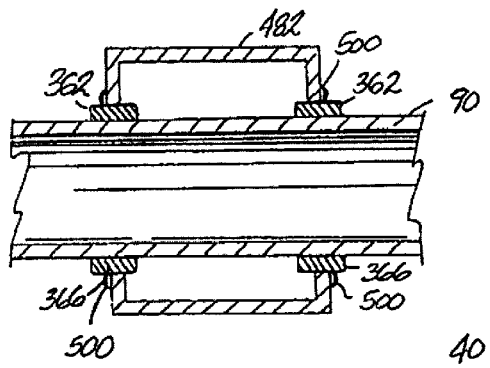
FIG. 40 is a sectional view taken along line 40—40 of FIG. 39.
Figure 39:
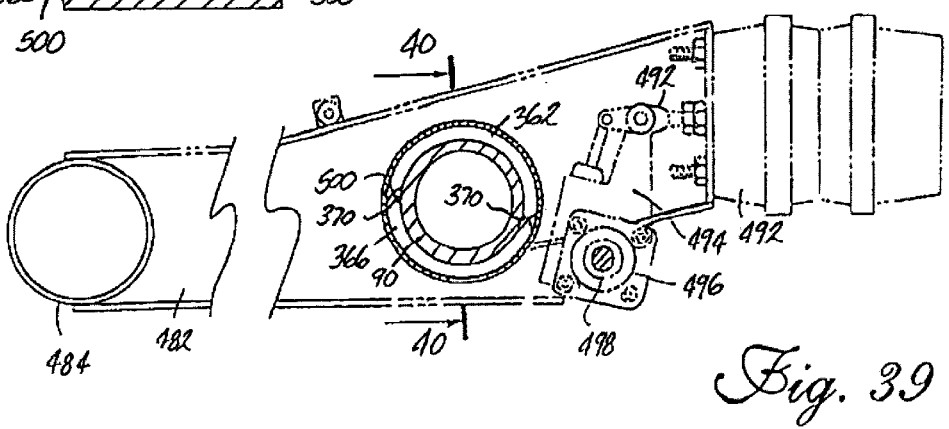
FIG. 39 is a side elevational view, partly in section, of a portion of the suspension system illustrated in FIG. 38.

Reference is now made to FIGS. 38–40 which show yet another embodiment of the invention. FIGS. 38–40 show a suspension system as disclosed in U.S. Pat. No. 5,366,237 but with the axle mounting assembly according to the invention in lieu of the axle mounting assembly disclosed in that patent. In particular, the suspension system comprises a pair of frame brackets 480 each of which mounts a trailing arm 482 through a pivot assembly 484 of the type disclosed in U.S. Pat. No. 4,166,640. Each of the trailing arms 482 has an axle opening 486 in each side thereof so that an axle extends directly through the trailing arm. The trailing arm 482 further mounts an air spring 490 and also mounts a brake actuator comprising a brake actuator chamber 492 having an actuator rod (not shown), a crank arm 494, an S-cam 498 which is journaled in an S-cam bearing 496, mounted to the trailing arm 482. The mounting of the brake actuator to the trailing arm is further disclosed in U.S. Pat. No. 5,366,237.

According to the invention, the axle mounting assembly illustrated in FIG. 30, for example, is used to mount the axle 90 to the trailing arms 482. Thus, the upper U-shaped plates 362 and the lower U-shaped plate 366 are welded to the sides of the trailing arm through weld beads 500. The U-shaped plates 362 and 366 are welded together in compression around the axle 90 in the manner described above with respect to FIG. 30 before welding the plates 362 and 366 to the axle 90.

Figure 41:
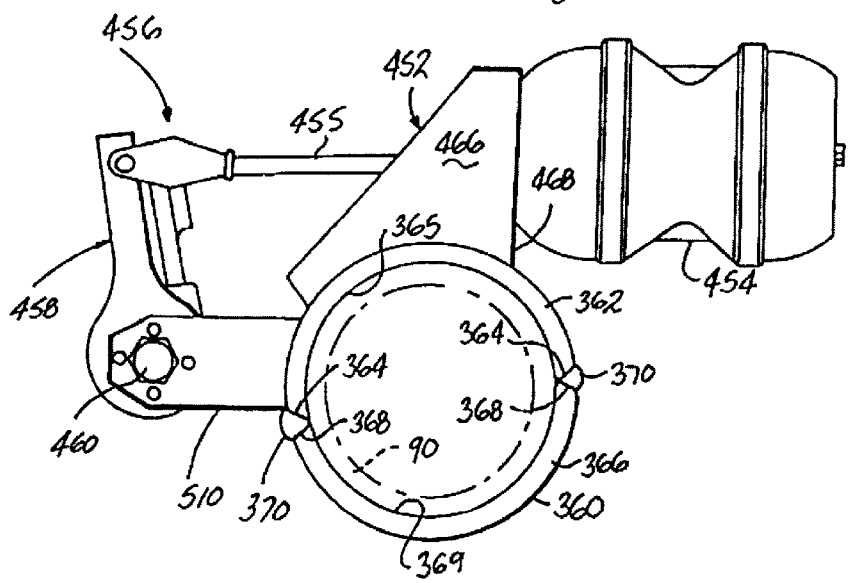
FIG. 41 is a side elevational view of a brake actuator mounted to an axle according to a seventeenth embodiment of the invention.

Referring now to FIG. 41, there is shown a spring brake actuator chamber 454 mounted to an axle 90 (shown in phantom lines). Like numerals have been used to designate like parts. The embodiment shown in FIG. 41 is very similar to the embodiment shown in FIGS. 36 and 37 except that the spring brake actuator chamber is mounted to an upper side of the axle 90 through a wrapper band which is not attached to a suspension but exists independently of the suspension. An upper U-shaped plate 362 provides a semicircular surface 365 to bear against the outer surface of the round axle 90. A lower U-shaped plate 366 having upper edges 368 has a semicylindrical inner surface 369 which bears against the outer surface of the axle 90. The upper and lower U-shaped plates 362 and 366 are joined through welds 370 after being pressed together in a manner described above to apply compression to the axle 90. A brake actuator chamber bracket 452 is mounted to the upper U-shaped plate 362. The brake actuator chamber bracket 452 comprises a pair of triangular side plates 466 and a rectangular end plate 468. A central opening 470 and a pair of bolt openings 472 (FIG. 37) are formed in the rectangular end plate 468. The brake actuator chamber 454 is mounted to the brake actuator chamber bracket 452 through bolts (not shown) which extend through the bolt openings 472 in the rectangular end plate 468. An actuator rod 455 extends from the brake actuator chamber and is connected to a slack adjuster 456 which in turn is connected to a crank arm 458. The crank arm 458 is rotatably mounted in a cam bracket 510 through an S-cam shaft 460 whereby the S-cam shaft is rotatably driven by the crank arm 458. The S-cam shaft mounts an S-cam 464 (FIG. 37) and is journaled in an S-cam bearing (not shown). The brake actuator comprising the brake chamber 454, the actuator rod 457, the slack adjuster 456, the crank arm 458, the S-cam shaft 460 and the S-cam 464 are all conventional and operate a brake on a wheel in conventional fashion. However, the mounting of the brake chamber 454 to the wrapper band formed by the upper and lower U-shaped plates, 362, 366, respectively, is new and avoids welding of these components to an axle.

A tower for mounting a radius rod to an axle can be mounted to the axle through a wrapper band or bands in the same fashion as the brake actuator is mounted to the axle as shown in FIG. 41. A conventional tower can be welded to the wrapper band 360 through a bracket which conforms to the exterior surface of the upper U-shaped plate 362. Otherwise the tower mounting is conventional. However, the use of the wrapper band 360 to mount a tower to the axle avoids welding of the tower directly to an axle as is conventional.

Figure 42:
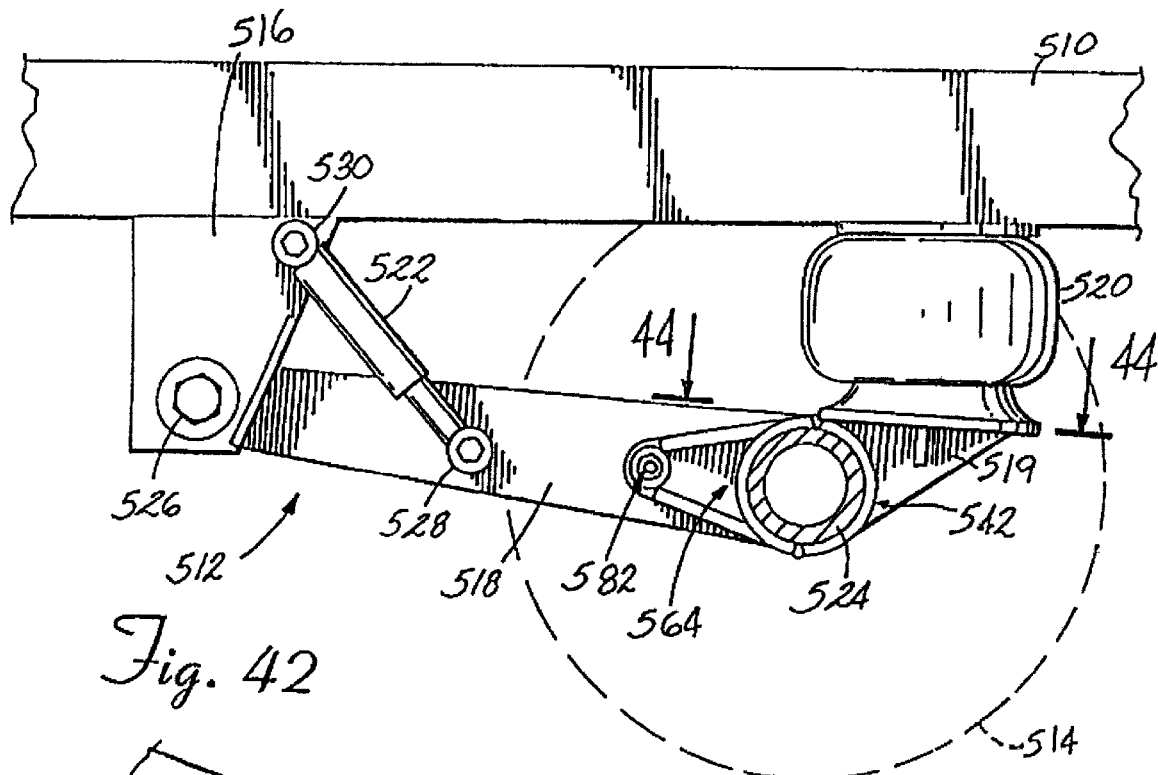
FIG. 42 is a side elevational view of another suspension system according to the invention attached to a vehicle frame.
Figure 43:
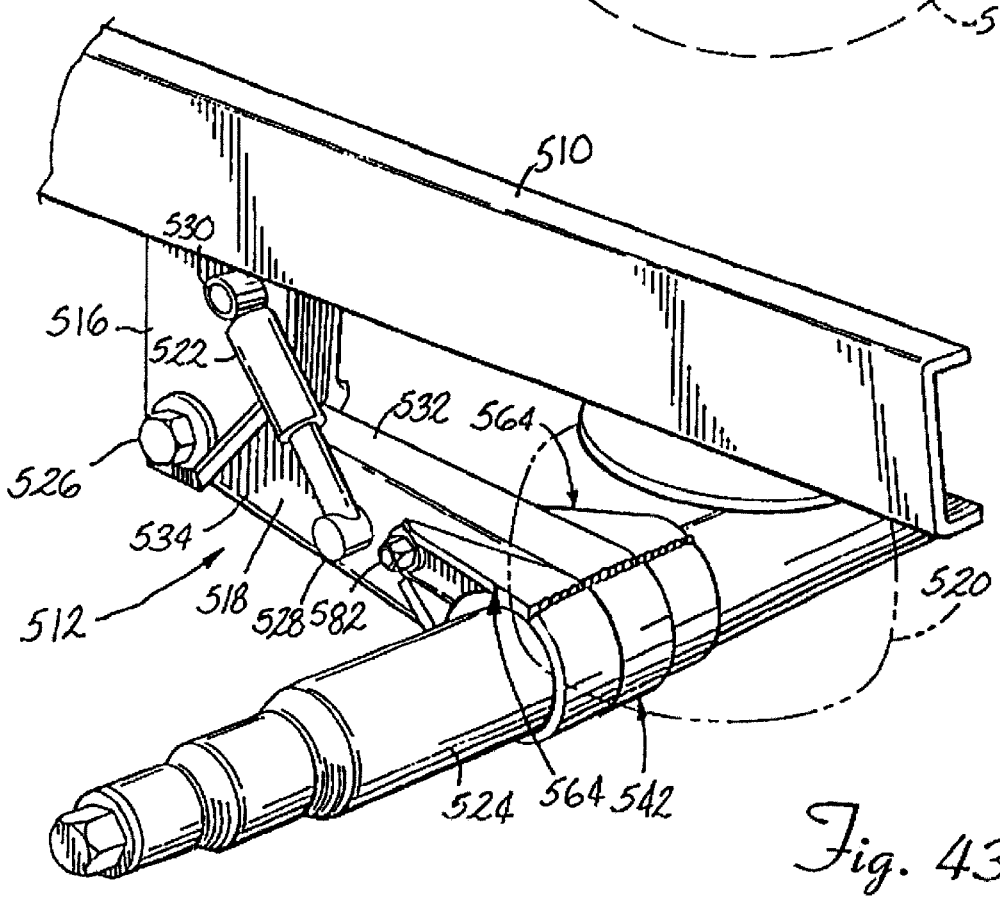
FIG. 43 is a perspective view of the suspension system illustrated in FIG. 42.

Referring now to FIG. 42, there is shown a portion of a frame 510 of a vehicle which has its forward direction to the left as viewed in FIG. 42 and a suspension system 512 according to the invention secured to the underside of the frame 510. The suspension system 512 comprises a trailing arm assembly including a frame bracket 516, a trailing arm 518, a beam extension 519 and an air spring 520. The frame bracket 516 is rigidly secured to the frame 510 by welding and/or bolts in conventional fashion. The trailing arm 518 is pivotably mounted to the frame bracket 516 through a pivot mounting 526 in conventional fashion. A shock absorber 522 is mounted between the frame bracket 516 and the beam 518 to damp the pivotable movement of the beam 518 with respect to the frame 516. The shock absorber 522 is mounted to the frame bracket 516 through a pivot mounting 530 and is pivotably mounted to the beam 518 through a pivot mounting 528. A round axle 524 is secured to the beam 518 through a pair of beam-axle connectors 564 (only one of which is shown in FIG. 42) and a bolt 582.

The suspension system according to the invention of FIG. 42 includes two trailing arm assemblies, one on each side of the vehicle frame, although only one such assembly is shown in FIG. 42. The other trailing arm assembly is a mirror image of the described assembly. The trailing arm assemblies are joined by the axle 524.

Figure 48:
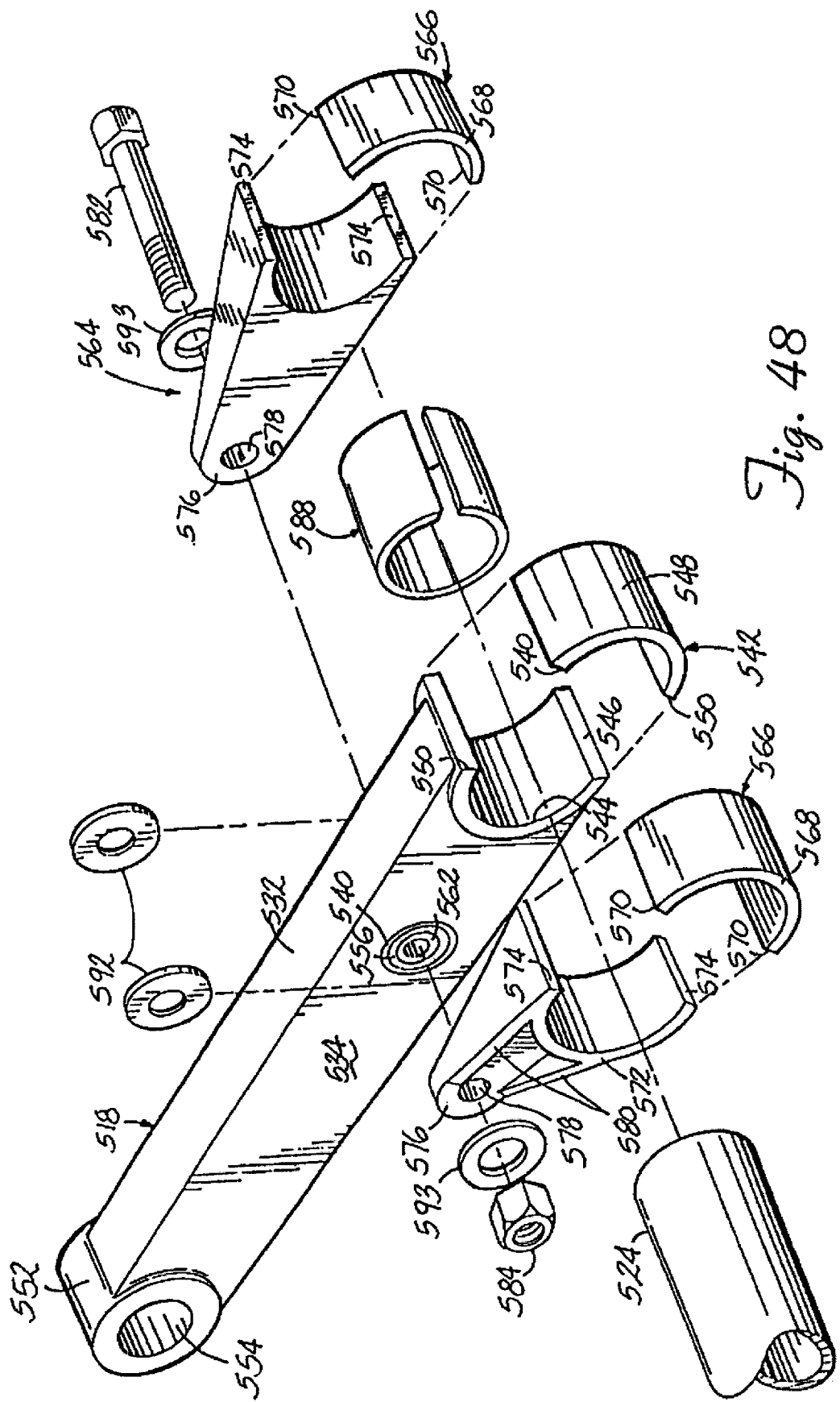
FIG. 48 is an exploded view of the beam and axle connections of the suspension system illustrated in FIGS. 42–47.

Referring now to FIGS. 43, 44, 45 and 48, the beam 518 has a top plate 532, a pair of side plates 534 and 536 and a bottom plate 538 all rigidly joined together, for example, by welding to form a rigid elongated beam which is rectangular in cross section. An I beam can be used in lieu of a box beam. Aligned openings 540 are provided in the side plates 534 and 536. A sleeve 542 is provided at a rear end of the beam and is formed by arcuate plates 544 and 548 which are joined at edge surfaces 546 and 550, respectively. As shown in FIG. 48, a front end of the beam 518 has a cylindrical collar 552 having an opening 554 therethrough to receive the pivot mounting 526.

Figure 45:
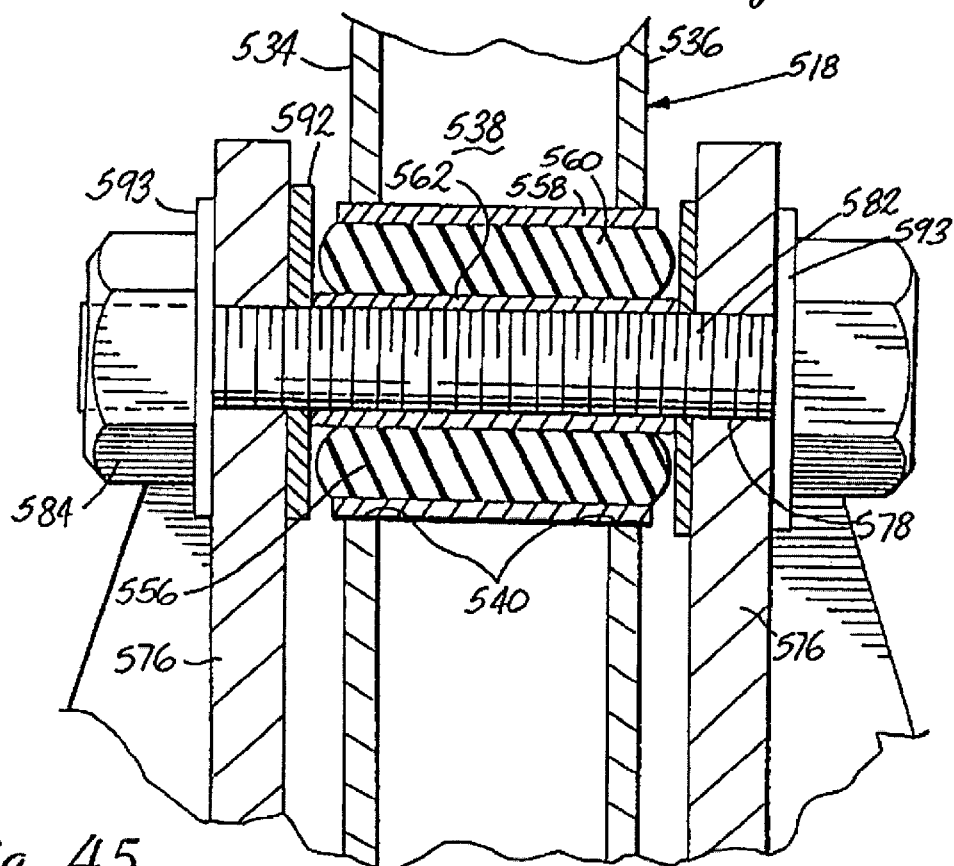
FIG. 45 is an enlarged cross-sectional view of the circled area labeled IV in FIG. 44.

Referring once again to FIG. 45, a bushing assembly 556 is mounted in the beam openings 540 and comprises an outer sleeve 558, a rubber bushing 560 and an inner sleeve 562, assembled together as a unit. Sleeve 562 and rubber bushing 560 are bonded together and then pressed into sleeve 558. As illustrated in FIG. 45, the outer sleeve 558 and the inner sleeve 562, as well as the bushing 560, are slightly longer than the distance between the outside surfaces of the side plates 534 and 536. The inner sleeve 562 is longer than the outer sleeve 558 and the bushing 560.

Figure 44:
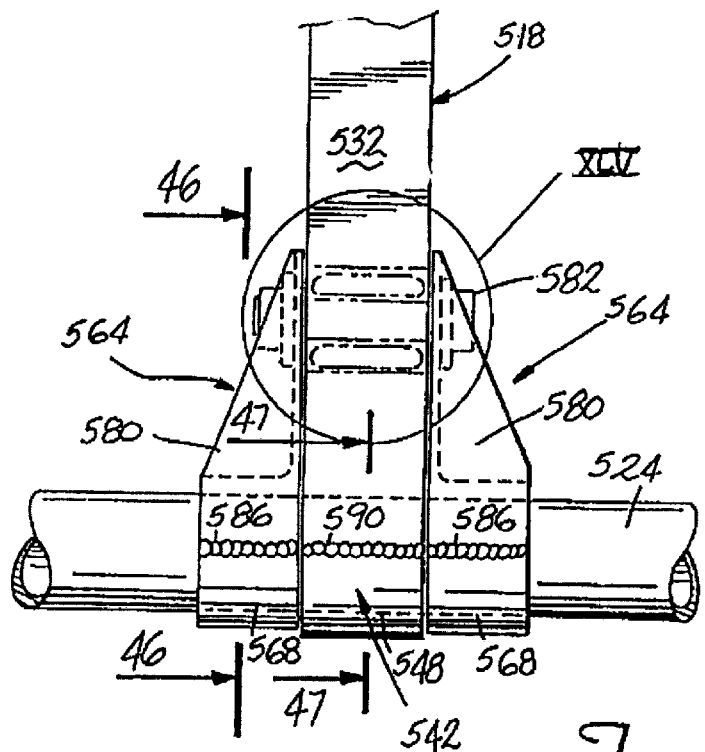
FIG. 44 is a plan view taken along lines 44—44 of FIG. 42.

Turning now to FIGS. 44 and 48, there are two beam-axle connectors 564 joined to the axle 524 at one end and to the beam 518 at the other end through the bushing assembly 556 on each trailing arm assembly. Each of the beam-axle connectors 564 are identical in construction and are oriented in mirror image orientation on the axles. Only one of the beam-axle connectors 564 will be described.

In FIG. 48, the beam-axle connector 564 comprises a wrapper band 566 at one end formed by an arcuate plate 568 having an edge 570 and an arcuate plate 572 having an edge 574. A triangular plate 576 is welded to the arcuate plate 572 at one side of the arcuate plate adjacent to the beam. A through bore 578 extends through the triangular plate 576 at a forward apex end of the plate 576. Triangular gusset plates 580 are mounted to the top and bottom of the triangular plate 576, by welding or casting, and are secured at the rear end thereof to the arcuate plate 572 along the axial length thereof at upper and lower portions thereof. As illustrated in FIG. 45, a bolt 582 extends through the through bores 578 on each of the beam-axle connectors 564 and through the bushing assembly 556, in particular, through the inner sleeve 562 to mount the beam-axle connector 564 to the beam 518. To this end, a nut 584 is threaded onto the bolt 582. As shown in FIG. 45, wear washers 592 are provided between the triangular plates 576 and the sleeve 562 to provide a wear surface. As also illustrated in FIG. 45, the inner sleeve 562 extends beyond the axial length of the outer sleeve 558 so that the beam-axle connectors 564 are free to articulate with respect to the beam 518 to accommodate roll and pitch forces at the axle 524 with respect to the frame 510. Washers 593 are mounted on the bolt 582 between the head of the bolt 582 and the triangular plate 576 at one side of the beam and between the nut 584 and the triangular plate 576 at the other side of the beam.

Figure 46:
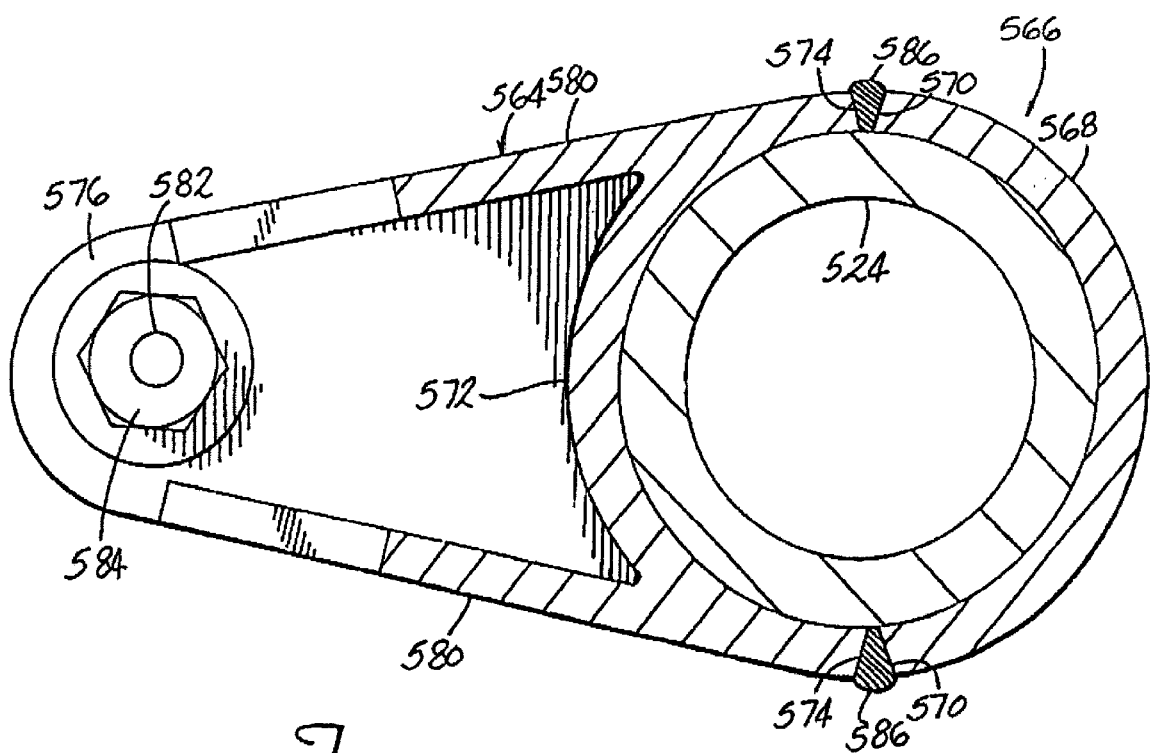
FIG. 46 is a partial sectional view taken along lines 46—46 of FIG. 44.

As shown in FIG. 46, the arcuate plates 568 and 572 surround the axle 524 and are joined together through welds 586 at the edges 570 and 574, respectively. The arcuate plates 568 and 572 are squeezed around the axle 524 to maintain the axle in compression and to maintain the arcuate plates 568 and 572 in tension. The arcuate plates are forced toward each other to put the axle 524 in compression before the welding operation. The welds 586 are made while the compressive forces are applied to the axle 524 by the arcuate plates 568 and 572. As the weld joint cools, it contracts, thereby enhancing the compressive forces against the axle 524. The axle 524 is thus joined to the beam-axle connectors 564 through the wrapper bands 566 and are held essentially by friction between the wrapper band 566 and the axle 524 due to the high compressive loading on the axle 524 by the wrapper band 566. The method of assembling the axle to wrapper bands is disclosed above with respect to FIGS. 1–41. Any of the various round axle wrapper band connections disclosed above can be used in the invention of the present application. Further, any of the various multi-sided wrapper band connections disclosed above can be used with corresponding multi-sided axles in the present invention.

Figure 47:
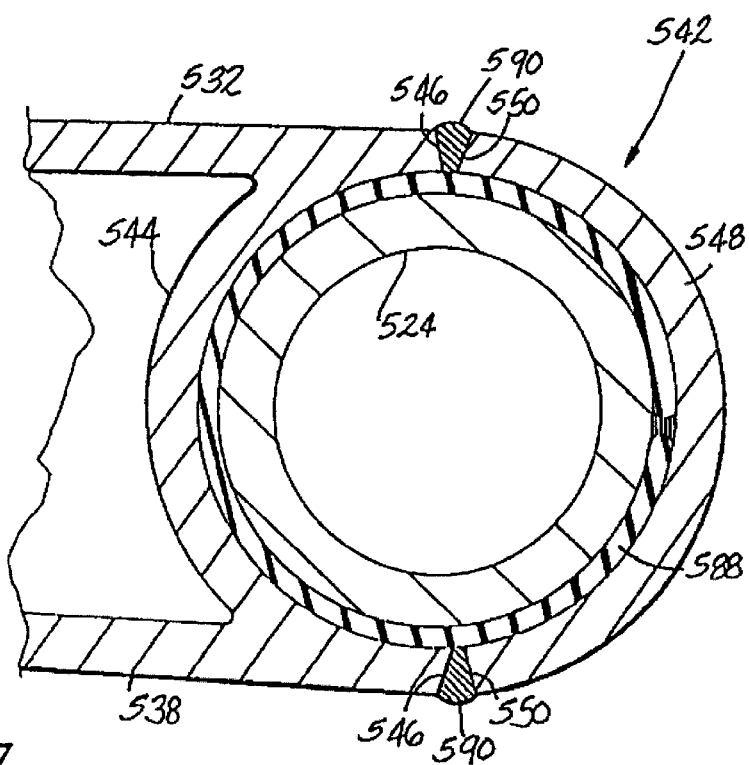
FIG. 47 is a partial sectional view taken along lines 47—47 of FIG. 44.

Reference is now made to FIG. 47 for a description of the relationship between the beam and the axle at the trailing end of the beam. The arcuate plates 544 and 548 form a collar which receives the axle 524. An elastomer sheet 588 is positioned between the axle 524 and the arcuate plates 544 and 548. The arcuate plates 544 and 548 are joined by a weld 590 or bolted flanges (not shown). The elastomer sheet 588 can, for example, be made of a urethane or rubber sheet material of approximately ³⁄₁₆ths inch thick and about 4 inches wide. The sheet is about as wide at the collar on the beam 518 but slightly shorter in length. Unlike the wrapper band 566, the collar on the beam 518 does not squeeze the axle 524. Rather, the axle can articulate somewhat within the beam collar by virtue of the rubber sheet 588.

Thus, the axle is rigidly connected to the beam-axle connectors 564 through the wrapper bands 566. The beam-axle connectors 564 are rigid in nature and are connected to the beam through the bushing assemblies 556. The rubber bushing 560 is yieldable and thus will deform when torsional stresses are applied to the beam-axle connectors 564. Thus, the axle can articulate with respect to the sleeve 542 of the beam 518 because of the rubber sheet 588 and also in view of the bushed connection 556 between the beam 518 and the axle beam connector 564. Thus, the axle 524 can articulate with respect to the beam 518 but yet is rigidly held in the beam-axle connectors 564. This suspension avoids stress risers between the axle and the axle bracket, yet the axle can articulate with respect to the beam.

The bushed connection between the beam-axle connectors and the beam also provides for a degree of tolerance in mounting the suspension to the frame. If there is a slight degree of misalignment between the axle and the frame, unreasonable stresses can be set up in a rigid axle connection, resulting in premature axle failure. The bushed connection between the beam and the beam-axle connectors 564 provides a level of tolerance for slight misalignment in mounting of the suspension to the frame and minimizes stresses in the axle due to misalignment of the suspension to the frame.

The invention also provides for economies of scale in manufacturing. The basic beam 518 is symmetrical about a horizontal axis and thus can be used on both sides of the suspension. Thus, there is less tooling and fewer inventory parts. The cost of the beam is thus lower.

The beam can also be used for different suspensions by simply adding on to the basic beam structure for different kinds of beams. These other suspensions are illustrated in FIGS. 49 and 50 to which reference is now made.

Figure 49:
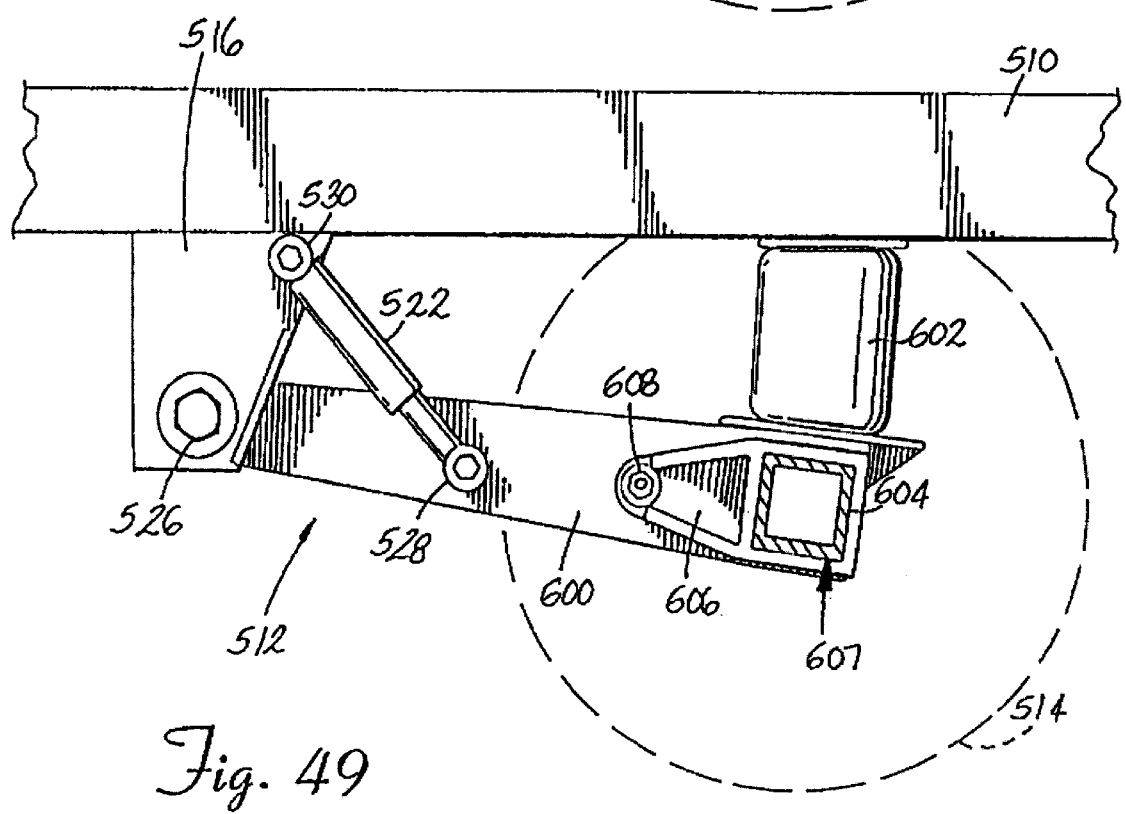
FIG. 49 is a side elevational view, like FIG. 42, showing a modified form of the invention.

FIG. 49 shows a suspension system according to the invention where like numbers have been used to designate like parts. In FIG. 49, a suspension system 512 has a beam 600 of substantially identical construction with the beam 518 except that it accommodates a square axle 604. The axle 604 is joined to the beam through a beam-to-axle connector 606 through a bushed joint 608. The construction of the axle-to-beam connector 606 is essentially the same as the beam-axle connector 564 except that it accommodates a square axle. The beam-axle connector 606 has a wrapper band 607 which squeezes the axle 604 as the wrapper band is assembled onto the axle in a manner described above. The suspension in FIG. 49 accommodates a rubber spring 602 rather than an air spring as in the previous embodiment.

Figure 50:
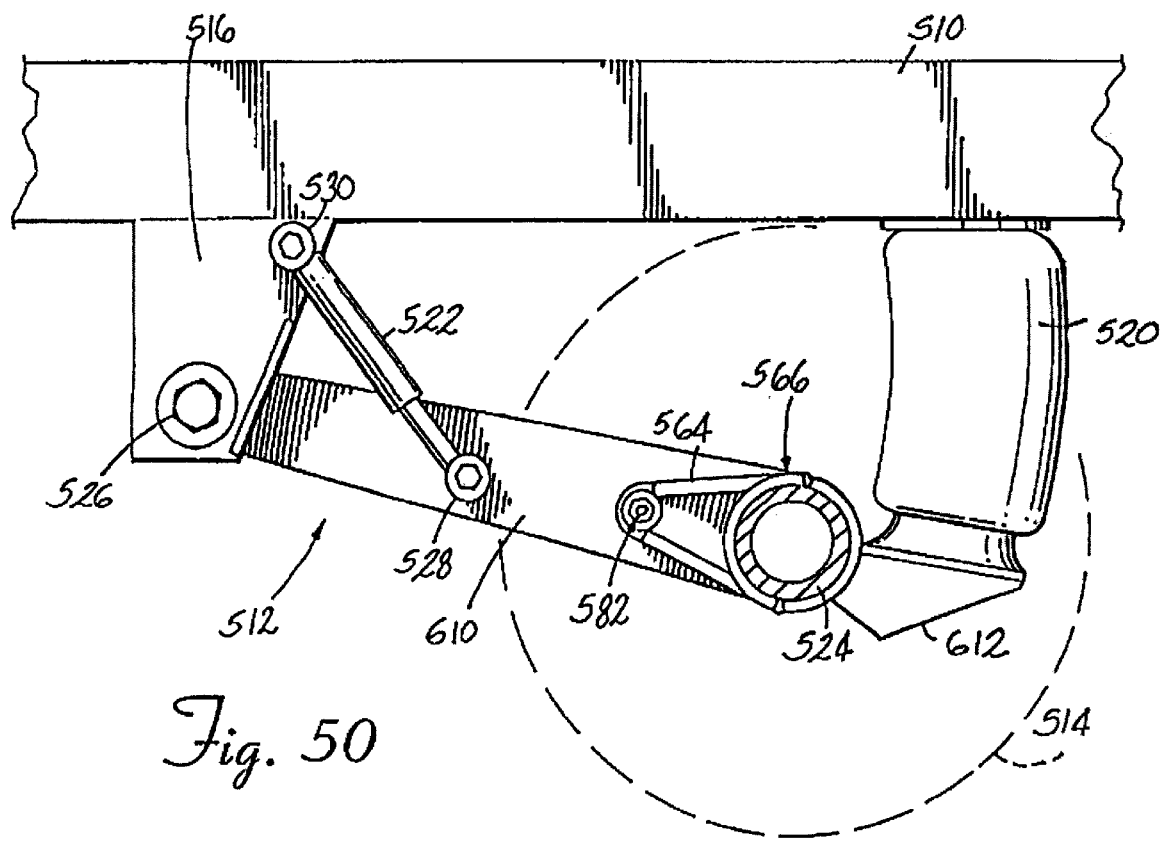
FIG. 50 is a side elevational view, like FIG. 42, showing use of the invention on a low-height suspension system.

Turning now to FIG. 50, another embodiment of the invention is shown and like numerals are used to designate like parts. A beam 610 of substantially identical construction with the beam 618 is pivotably mounted to a frame bracket 516 in a pivotable mounting 526. An axle 524 is mounted to a beam-axle connector 564 through a wrapper band 566 in a manner identical to the first embodiment described above. In this embodiment, a beam extension 612 is welded to the outer end of the beam 610 and supports an air spring 520 in a low-slung position for a low mounting height configuration.

Referring now to FIGS. 51 and 52, there is shown an alternate embodiment of the invention where like numerals are used to designate like parts. In this form of the invention, the beam axle connector is modified somewhat and is welded to the axle 524 rather than squeezed onto the axle as in the previous embodiments. More particularly, a modified beam axle connector 622 comprises a triangular plate 629 which has an opening at a forward end thereof and has a bolt 582 extending therethrough for connecting the plate 629 to the trailing arm 518 through a bushed joint identical with that illustrated in FIG. 4 and described above. The triangular plate 629 has an arcuate plate 624 mounted at a rear end thereof, an upper gusset plate 626 mounted to an upper portion thereof and a lower gusset plate 628 mounted a lower portions thereof. As illustrated in FIG. 51, the arcuate plate has a circumferential arc of about 90°. The edges of the arcuate plate 624 are welded to the axle 524 at weld bead 630 at an upper portion thereof and at weld bead 632 at a lower portion thereof. As in the previous embodiment, a beam axle connector 622 is provided on each side of the beam 518 and each of the beams 518 has two beam axle connectors.

The beam axle connectors illustrated in FIGS. 51 and 52 mount the axle 524 to the beam 518 through a pair of articulated joints, one of which is the bushed joint illustrated in FIG. 45 and the other of which is the connection between the axle 524 and the beam 518 through the sleeve 542 and the elastomeric sheet 588. To this extent, the axle-to-beam connector functions in the same manner in the embodiment shown in FIGS. 51 and 52 as in the embodiments shown in FIGS. 42–50.

The invention provides for articulation between the axles and beams to give flexibility to the beams to accommodate stresses due to roll of the axle. Further, the suspensions avoid the problem of tolerances and stresses of mounting brackets resulting from misalignment of the suspensions to the frame. Still further, the lateral motion of the axle with respect to the frame is accommodated in the suspension as a couple due to the two beam-to-axle suspension mountings. The couple will react to lateral motion and avoid the necessity of a track bar between the axle and the beam.

Reasonable variation and modification are possible within the scope of the foregoing disclosure and drawings without departing from the spirit of the invention which is defined in the appended claims.

What is claimed is:

1. In a vehicle suspension for mounting ground-engaging wheels to a vehicle frame, the suspension system comprising at least two arms secured to opposite sides of the frame; at least one wheel carrying axle mounted to said arms through a pair of axle mounting assemblies through which the axle is mounted to the arms, the improvement comprising:

a pair of separate and distinct hollow wrapper bands having a width greater than a thickness and circumscribing the axle closely adjacent each other with inner surface portions shaped to conform to at least a portion of at least two sets of diametrically opposed and circumferentially spaced external surfaces of the axle;

the wrapper bands are in tension sufficient to compress the axle at each of the inner surface portions of the wrapper bands and evenly distribute a compressive load on the axle across the at least two sets of diametrically opposed external surfaces of the axle sufficient to prevent relative movement of the axle with respect to the wrapper bands under ordinary service conditions without welding the wrapper bands to the axle; and a vehicle component fixed to the pair of wrapper bands.

2. A vehicle suspension according to claim 1 wherein the axle and the wrapper bands are multi-sided in cross section, formed by side walls joined at corners, and the wrapper band has compression surfaces which compress the axle inwardly near a tangent point between the side walls of the axle and the corner radius of each of the corners of the axle.

3. A vehicle suspension according to claim 1 wherein the axle and the wrapper bands are multi sided in cross section, formed by side walls joined at corners, and the wrapper band has compression surfaces which compress the axle inwardly at the corners of the axle.

4. A vehicle suspension according to claim 1 wherein the axle is substantially round in cross section and the wrapper bands have compression surfaces in contact with the axle to apply compressive forces in a relatively even distribution around the circumference of the axle.

5. A vehicle suspension according to claim 4 wherein the axle is slightly out of round in cross section to restrain the rotational movement of the axle with respect to the wrapper band.

6. A vehicle suspension according to claim 5 wherein the axle is elliptical in cross section.

7. A vehicle suspension according to claim 5 wherein the axle is egg-shaped in cross section.

8. A vehicle suspension according to claim 1 wherein the axle and the wrapper band each have an aperture extending therethrough in register with each other and further comprising a pin in the apertures.

9. A vehicle suspension according to claim 8 wherein the pin is wedged into the axle aperture to compress the axle around the axle aperture.

10. A vehicle suspension according to claim 9 wherein the pin is welded to the wrapper band.

11. A vehicle suspension according to claim 8 wherein the apertures in the wrapper band have a cross dimension in a circumferential direction of the wrapper band greater than the cross dimension in an axial direction thereof.

12. A vehicle suspension according to claim 1 and further comprising a brake actuator bracket fixed to the wrapper band and a brake actuator mounted to the brake actuator bracket.

13. A vehicle suspension according to claim 1 wherein the wrapper band has at least one aperture extending therethrough and further comprising a washer positioned in the at least one aperture and welded to the axle.

14. A vehicle suspension according to claim 13 wherein the weld is a plug weld.

15. A vehicle suspension according to claim 13 wherein the aperture is positioned at a neutral axis of the axle.

16. A vehicle suspension according to claim 13 wherein the at least one aperture in the wrapper band has a cross dimension in a circumferential direction of the wrapper band greater than the cross dimension in an axial direction.

17. A vehicle suspension according to claim 1 wherein the wrapper bands have chamfered surfaces at at least one edge portion thereof at the upper and lower portion of the axle.

18. A vehicle suspension according to claim 1 wherein the width to thickness ratio of each wrapper band is substantially in excess of one.

19. A vehicle suspension according to claim 1 wherein each of the wrapper bands comprises:
   a bracket plate having an inner surface extending around at least a portion of the axle and forming at least some of said inner surface portions;
   a wrapper plate having an inner surface extending around at least a portion of the axle and forming at least some of the inner surface portions, the wrapper plate being juxtaposed to said bracket plate;
   the conforming inner surface portions of the bracket plate and the conforming inner surface portions of the wrapper plate are generally diametrically opposed to each other on the axle and apply compressive forces to the axle to maintain the axle support assemblies in fixed position on said axle;
   the wrapper plate and the bracket plate have end portions adjacent to each other; and
   a fastener joining the end portions of the wrapper plate and said bracket plate.

20. A vehicle suspension according to claim 19 wherein the fastener is a weld.

21. A vehicle suspension according to claim 20 wherein each of the wrapper plates has a pair of ears or notches, one on each end portion thereof, for applying tension to the wrapper plate before welding the wrapper plate to the bracket plate.

22. A vehicle suspension according to claim 21 wherein the bracket plate and the wrapper plate both have tail end portions which overlap with each other and the weld is positioned at the overlapping end tail portions of the wrapper plate and the bracket plate.

23. A vehicle suspension according to claim 19 wherein the fastener is a mechanical connection.

24. A vehicle suspension according to claim 19 wherein each of the bracket plates extend about 180° around the axle and each of the wrapper plates extend about 180° around the axle.

25. A vehicle suspension according to claim 1 wherein the wrapper bands are in tension in excess of 15,000 psi.

26. A vehicle suspension according to claim 1 wherein the wrapper bands are in tension in excess of 25,000 psi.

27. A vehicle suspension according to claim 1 wherein the axle is rectangular in cross-sectional configuration and is formed from an upper U-shaped plate and a lower U-shaped plate which are welded together at the ends thereof, and the upper U-shaped plate has a thickness less than the thickness of the lower U-shaped plate.

28. A vehicle suspension according to claim 1 wherein the wrapper bands form a part of the axle mounting assembly through which the axle is mounted to one of the arms.

29. A vehicle suspension according to claim 28 and further comprising a brake actuator and a brake actuator bracket; the brake actuator is mounted to the brake actuator bracket and the brake actuator bracket is welded to the wrapper bands.

30. A vehicle suspension according to claim 29 wherein the axle mounting assembly further comprises an axle bracket fixed to the wrapper bands and mounted to the arm; the brake actuator includes an S-cam shaft which extends parallel to the axle; and an S-cam bearing mounted to the wrapper bands and rotatably mounting the S-cam shaft.

31. A vehicle suspension according to claim 28 wherein there are four wrapper bands in the pair of axle mounting assemblies.

32. A vehicle suspension according to claim 28 and further comprising a brake actuator; the brake actuator is mounted to the axle through the wrapper bands.

33. A vehicle suspension according to claim 28 and further comprising a brake actuator mounted to the wrapper bands.

34. A vehicle suspension according to claim 33 and further comprising an S-cam shaft rotatably driven by said brake actuator and mounted to said wrapper bands for pivotal movement with respect thereto.

35. A vehicle suspension according to claims 28 and further comprising a brake actuator and an S-cam shaft pivotally driven by said brake actuator; the S-cam shaft is mounted directly to the wrapper bands for pivotal movement with respect thereto.

36. A vehicle suspension according to claim 1 wherein the vehicle component is a brake actuator.

37. A vehicle suspension according to claim 1 wherein the vehicle component is a radius rod tower.

38. A vehicle suspension according to claim 1 and further comprising an adhesion-promoting coating on at least one of the inner surface portions of the hollow wrapper bands and the diametrically opposed external surfaces of the axle.

39. A vehicle suspension according to claim 38 wherein the adhesion-promoting coating is selected from the group consisting of an adhesion-promoting liquid, paint, adhesive and thin film fillers.

40. A vehicle suspension according to claim 1 wherein the wrapper bands are formed of two arcuate portions which are joined at confronting edges.

41. A method of mounting a vehicle component to an axle comprising the steps of:
   providing a bracket plate having an inner surface portion adapted to extend around a portion of an axle and shaped to conform to at least a portion of an external surface portion of the axle;
   providing a wrapper plate having an inner surface adapted to extend around a portion of the axle and having surface portions shaped to conform to at least another external surface portion of the axle;
   positioning the wrapper plate in confronting juxtaposition to said bracket plate around said axle;
   applying a tensile force to end portions of the wrapper plate and bracket plate to compress the axle between the bracket plate and the wrapper plate and to thereby place the wrapper plate and bracket plate in tension; and
   fastening the end portions of the bracket plate to the end portions of the wrapper plate while the bracket plate and wrapper plate are in tension, whereby the axle is maintained in compression by the tensile forces in the wrapper band after the fastening step.

42. A method according to claim 41 wherein the bracket plate and the wrapper plate have tail end portions which overlap with each other and a weld is positioned at the overlapping tail end portions of the wrapper plate and the bracket plate to fasten the wrapper plate to the bracket plate.

43. A method of mounting a vehicle component to an axle according to claim 41 and further comprising the step of fixing the vehicle component to at least one of the wrapper plate and the bracket plate after the fastening step.

44. A method of mounting a vehicle component to an axle according to claim 41 and further comprising the step of fixing the vehicle component at least one of the wrapper plate and the bracket plate before the fastening step.

45. A method of mounting a vehicle component to an axle according to claim 43 wherein the vehicle component is a suspension system through which the axle is mounted to the frame of a vehicle.

46. In a vehicle suspension for mounting ground-engaging wheels to a vehicle frame, the suspension system comprising at least two arms secured to opposite sides of the frame; at least one wheel carrying axle mounted to said arms through a pair of axle mounting assemblies;

- at least one hollow wrapper band having a width greater than a thickness and circumscribing the axle with inner surface portions shaped to conform to at least a portion of at least two sets of diametrically opposed and circumferentially spaced external surfaces of the axle; characterized in that:
- the at least one wrapper band is under a tension sufficient to compress the axle at each of the inner surface portions of the at least one wrapper band and evenly distribute a compressive load on the axle across the at least two sets of diametrically opposed external surfaces of the axle sufficient to prevent relative movement of the axle with respect to the at least one wrapper band under ordinary service conditions; and
- a brake actuator and an S-cam shaft pivotally driven by said brake actuator; the S-cam shaft is mounted directly to the at least one wrapper band for pivotal movement with respect thereto.

47. A vehicle suspension according to claim 46 wherein said brake actuator is also mounted directly to the at least one wrapper band.

48. A vehicle suspension according to claim 28 wherein the axle mounting assembly comprises a collar on each of the arms, the collar receiving the axle;

- an elastomeric layer between the axle and the collar for articulation between the axle and the collar.

49. A vehicle suspension according to claim 48 wherein the axle mounting assemblies further comprise a beam-axle connector which is mounted to one of the arms at one end thereof through a bushed connection.

50. A vehicle suspension according to claim 49 wherein each beam-axle connector is generally triangular in two dimensional configuration and has a reinforcing gusset at an upper portion thereof and at the lower portion thereof.

51. A vehicle suspension according to claim 50 wherein each beam-axle connector further includes an arcuate plate at the other end and forming a portion of a respective one of the wrapper bands.

52. A vehicle suspension according to claim 51 wherein an arcuate plate extends about 180° degrees around the axle and mates with a second arcuate plate to form the respective one of the hollow wrapper bands.

53. A vehicle suspension according to claim 48 wherein there are two beam-axle connectors, one on each side of the arm, and each beam-axle connector is connected to the arm and to the axle in the same manner.

54. A vehicle suspension according to claim 53 wherein each of the beam-axle connectors is identical and symmetrical about a longitudinal axis.

* * * * *